(12) United States Patent
Arflack

(10) Patent No.: US 7,654,841 B2
(45) Date of Patent: Feb. 2, 2010

(54) PRE-TERMINATED OUTLET ASSEMBLY FOR RACEWAY SYSTEMS

(75) Inventor: Brian K Arflack, Burr Ridge, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/963,097

(22) Filed: Dec. 21, 2007

(65) Prior Publication Data

US 2009/0163074 A1   Jun. 25, 2009

(51) Int. Cl.
*H01R 4/60* (2006.01)
(52) U.S. Cl. .................................. 439/211; 174/68.3
(58) Field of Classification Search ................ 439/209, 439/211; 174/48, 49, 50, 58, 60, 67, 68.3, 174/72, 480, 481
See application file for complete search history.

(56) References Cited

U.S. PATENT DOCUMENTS

| | | | |
|---|---|---|---|
| 4,017,137 A | 4/1977 | Parks | |
| 4,872,849 A | 10/1989 | Long | |
| 4,874,322 A | 10/1989 | Dola et al. | |
| 4,952,163 A | 8/1990 | Dola et al. | |
| 5,901,512 A * | 5/1999 | Bullwinkle | 52/220.7 |
| 5,998,732 A | 12/1999 | Caveney et al. | |
| 6,036,516 A * | 3/2000 | Byrne | 439/215 |
| 6,350,135 B1 * | 2/2002 | Acklin et al. | 439/211 |
| 6,375,490 B1 | 4/2002 | Yao | |
| 6,881,083 B2 | 4/2005 | Vargas et al. | |
| 6,936,766 B1 | 8/2005 | Galasso | |
| 7,009,108 B2 | 3/2006 | Vargas et al. | |
| 7,148,419 B1 | 12/2006 | Harrigan | |
| 7,168,331 B1 * | 1/2007 | Bernard et al. | 73/862.541 |
| D539,231 S | 3/2007 | Stempinski | |
| 7,193,159 B2 | 3/2007 | Makwinski et al. | |
| 7,262,371 B2 | 8/2007 | Makwinski et al. | |
| 2006/0117684 A1 | 6/2006 | Picard et al. | |
| 2007/0044987 A1 | 3/2007 | VanderVelde et al. | |
| 2007/0044988 A1 | 3/2007 | VanderVelde | |
| 2007/0279887 A1 | 12/2007 | Sullivan et al. | |

FOREIGN PATENT DOCUMENTS

WO            9730493 A       8/1997

OTHER PUBLICATIONS

Qualtek Electronics Corp. Drawing of Part No. 739W-X2/20, one page, dated Feb. 7, 2007.
3M Scotchlok 567 Self-Stripping Electrical Tap Connectors Data Sheet, two pages, dated 2003.
Tyco Electronics 20 amp Panel Mount Convenience Outlet Brochure, two pages, dated 2001.
WAGO Innovative Connections Data Sheet for Item No. 222-413, three pages, dated Jan. 29, 2008.
Wiremold/Legrand 2005 Brochure "This Is More Than Metal Raceway," four pages, dated 2005.

* cited by examiner

*Primary Examiner*—James Harvey
(74) *Attorney, Agent, or Firm*—Robert A. McCann; Christopher S. Clancy; James H. Williams

(57) ABSTRACT

Certain embodiments of the present invention provide a pre-terminated outlet assembly. The pre-terminated outlet assembly includes a device bracket, an outlet, and a plurality of electrical conductors. The outlet is connected to the device bracket. The plurality of electrical conductors is pre-terminated at the outlet.

16 Claims, 24 Drawing Sheets

PRE-TERMINATED OUTLET ASSEMBLY FOR RACEWAY SYSTEMS

BACKGROUND OF THE INVENTION

The present invention relates to raceway systems. More particularly, the present invention relates to a pre-terminated outlet assembly for raceway systems.

Installing electrical outlets in raceway systems is well known. For example. U.S. Patent Application Publication No. 2007/0044987 A1 relates to multi-channel metal raceway systems, such as the PAN-WAY® PMR40 Multi-Channel Metal Raceway System (Panduit Corporation, Tinley Park, Ill.), and describes installing electrical outlets in multi-channel metal raceway systems. See ¶ 22: see also FIG. 3. As another example, U.S. Pat. No. 5,998,732 relates to nonmetallic raceway systems, such as the PAN-WAY® T-70 Non-Metallic Raceway System (Panduit Corporation, Tinley Park, Ill.), and describes installing electrical outlets in non-metallic raceway systems. See COL. 6. LL. 13-38: see also FIG. 3. As another example. U.S. Patent Application Publication No. 2007/0044988 A1 relates to single-channel metal raceway systems, such as the PAN-WAY® PMR5/PMR7 Single-Channel Metal Raceway System (Panduit Corporation, Tinley Park, Ill.), and describes installing electrical outlets in single-channel metal raceway systems. See ¶ 45: see also FIG. 9.

However, installing electrical outlets in raceway systems is time-consuming and labor-intensive, as the electrical outlets are typically installed by hand, with each of the outlets being individually wired at the time of installation. After the electrical outlets are installed, it is difficult to change their configuration (e.g., the number of outlets, the type of outlets, the type of raceway). Additionally, if the electrical outlets are not installed properly, they are a potential safety hazard for both the installer and the end user.

Therefore, there is a need for a pre-terminated outlet assembly for raceway systems. More particularly, there is a need for a pre-terminated outlet assembly that can be installed quickly and easily. There is also a need for a pre-terminated outlet assembly that can be easily reconfigured after installation. Additionally, there is a need for a pre-terminated outlet assembly that is safer to install and use.

BRIEF SUMMARY OF THE INVENTION

Certain embodiments of the present invention provide a pre-terminated outlet assembly. The pre-terminated outlet assembly includes a device bracket, an outlet, and a plurality of electrical conductors. The outlet is connected to the device bracket. The plurality of electrical conductors is pre-terminated at the outlet.

Certain embodiments of the present invention provide a method for assembling a pre-terminated outlet assembly. The method includes selecting a device bracket, connecting an outlet to the device bracket, and pre-terminating a plurality of electrical conductors at the outlet.

Certain embodiments of the present invention provide a method for installing a pre-terminated outlet assembly. The method includes selecting a pre-terminated outlet assembly and connecting the pre-terminated outlet assembly to a raceway. The pre-terminated outlet assembly includes a device bracket, an outlet, and a plurality of electrical conductors. The outlet is connected to the device bracket. The plurality of electrical conductors is pre-terminated at the outlet.

Figure 1:
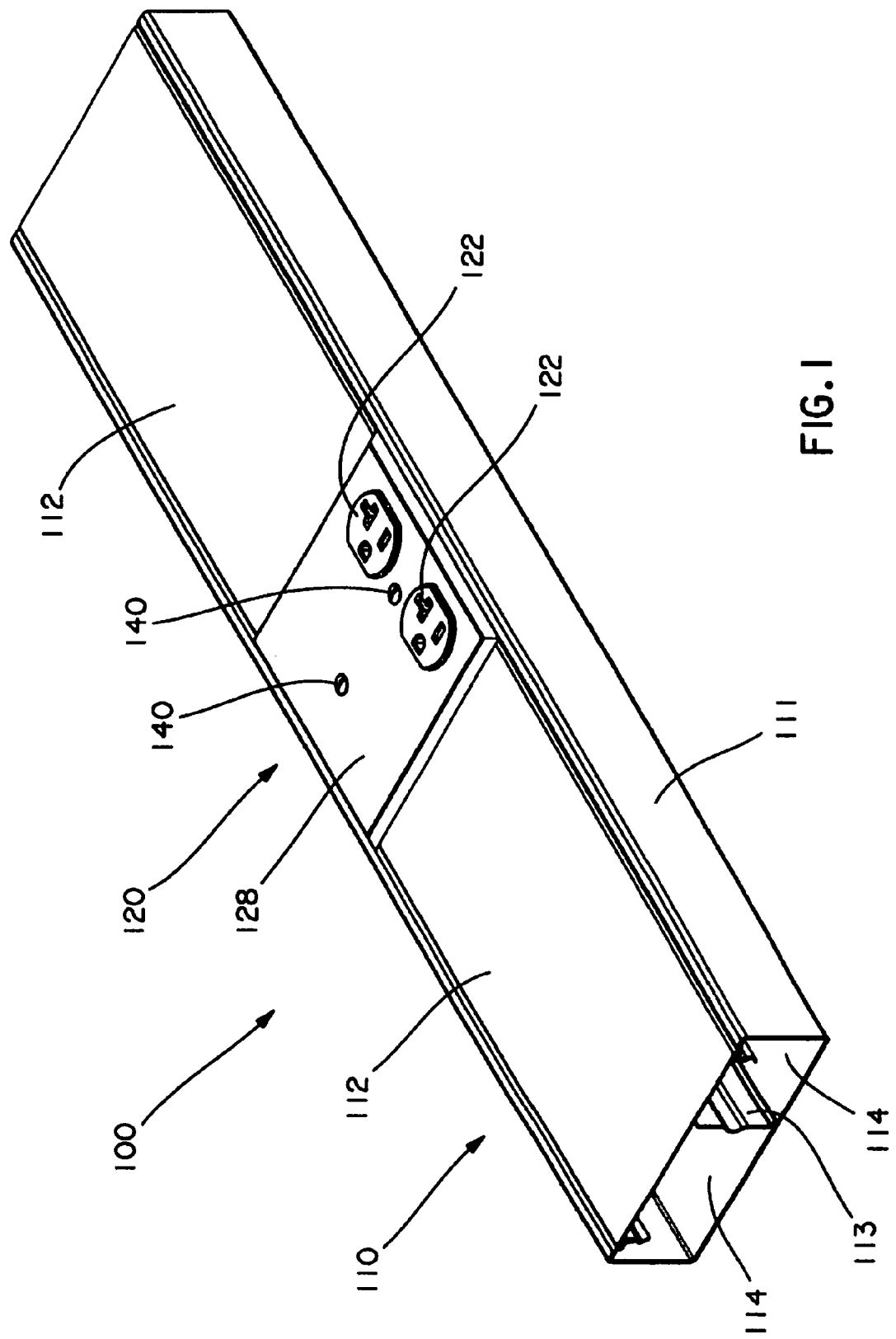
FIG. 1 is a top front perspective view of a pre-terminated outlet assembly installed in a multi-channel metal raceway according to a first preferred embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE PREFERRED EMBODIMENTS

FIGS. 1-5 illustrate a pre-terminated outlet assembly 120 installed in a multi-channel metal raceway 110, such as the PAN-WAY® PMR40 Multi-Channel Metal Raceway System (Panduit Corporation, Tinley Park, Ill.), according to a first preferred embodiment 100 of the present invention.

FIG. 1 is a top front perspective view of the pre-terminated outlet assembly 120 installed in the multi-channel metal raceway 110 according to the first preferred embodiment 100 of the present invention. As best seen in FIG. 1, the raceway 110 includes a base 111 and one or more covers 112. The raceway 110 also includes a divider 113. The divider 113 is adapted to divide the raceway 110 into a plurality of channels 114. The size of the channels 114 may vary depending on the intended use thereof (e.g., 50/50, 60/40, 70/30). The pre-terminated outlet assembly 120 includes a faceplate 128.

Figure 2:
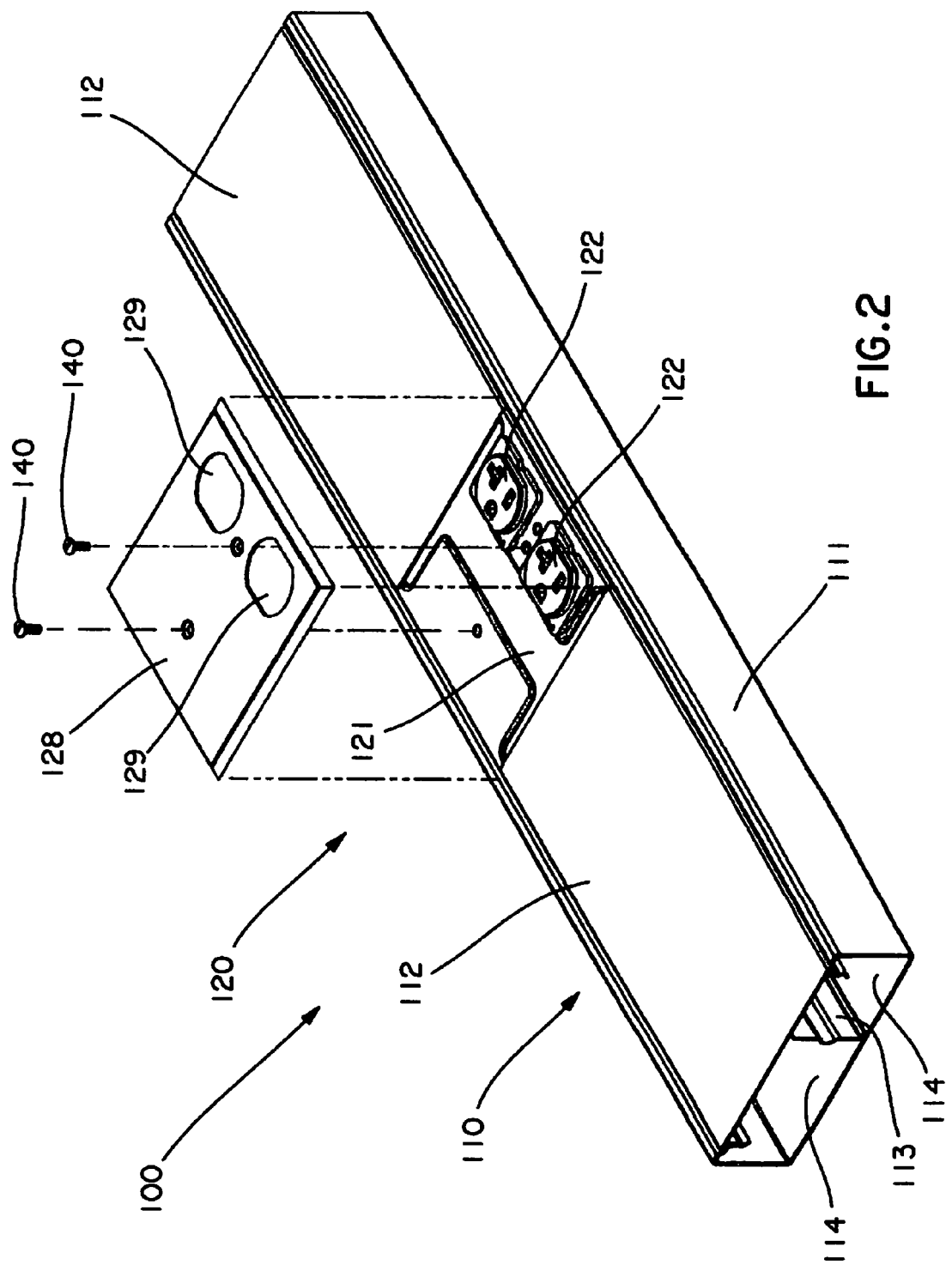
FIG. 2 is an exploded top front perspective view of the raceway of FIG. 1, with the faceplate removed therefrom.

FIG. 2 is an exploded top front perspective view of the raceway 110 of FIG. 1, with the faceplate 128 removed therefrom. As best seen in FIG. 2, the faceplate 128 is connected to the pre-terminated outlet assembly 120, for example, using one or more fasteners 140, such as screws. The faceplate 128 includes one or more openings 129. The one or more openings 129 of the faceplate 128 are adapted to receive one or more electrical outlets 122. The faceplate 128 covers a portion of the raceway 110, as well as the pre-terminated outlet assembly 120.

Figure 3:
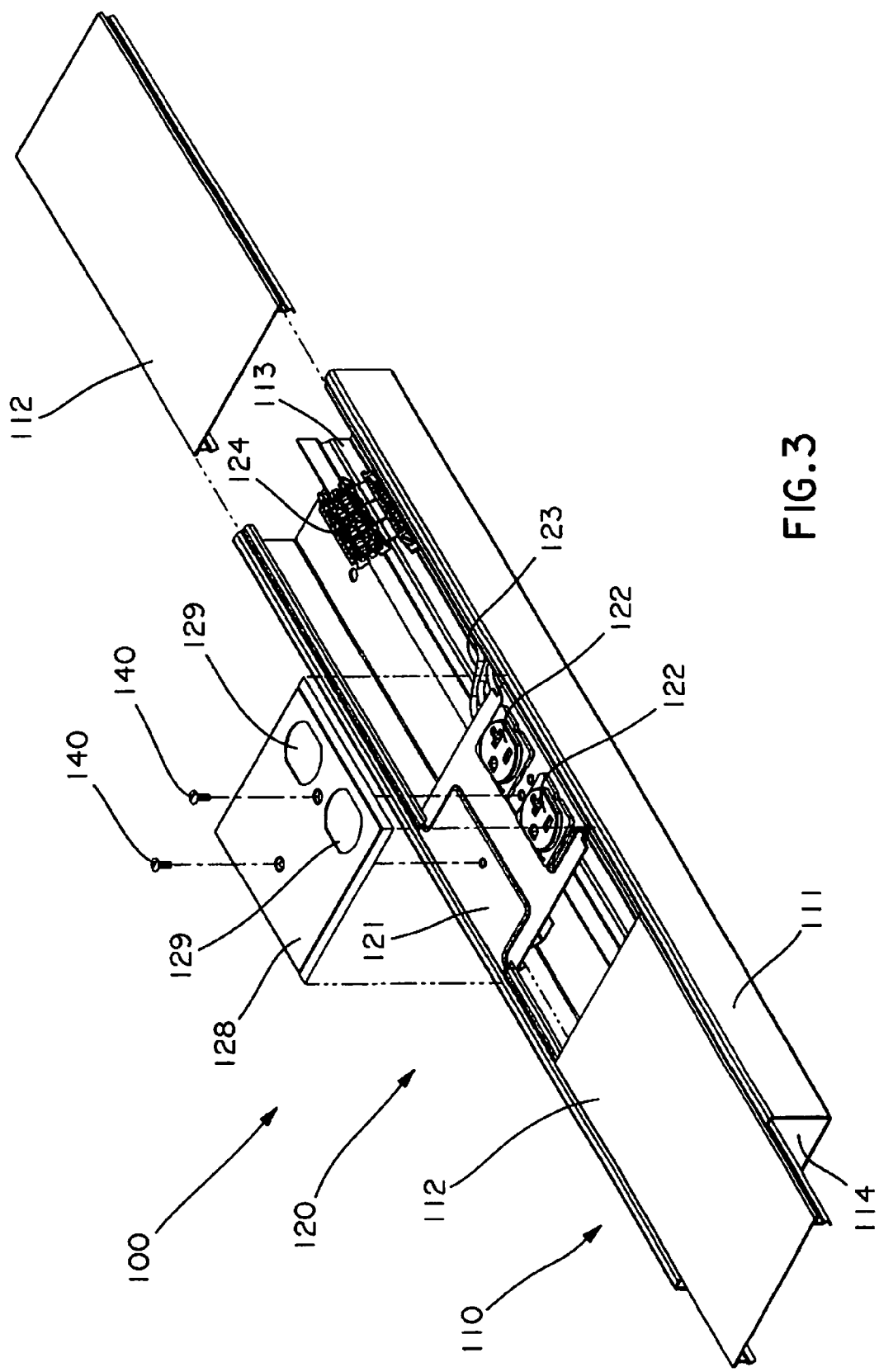
FIG. 3 is an exploded top front perspective view of the raceway of FIG. 1, with the faceplate and the raceway covers removed therefrom.

FIG. 3 is an exploded top front perspective view of the raceway 110 of FIG. 1, with the faceplate 128 and the raceway covers 112 removed therefrom. As best seen in FIG. 3, the faceplate 128 and the raceway covers 112 are removable, allowing access to the raceway 110 without disturbing the pre-terminated outlet assembly 120.

Figure 4:
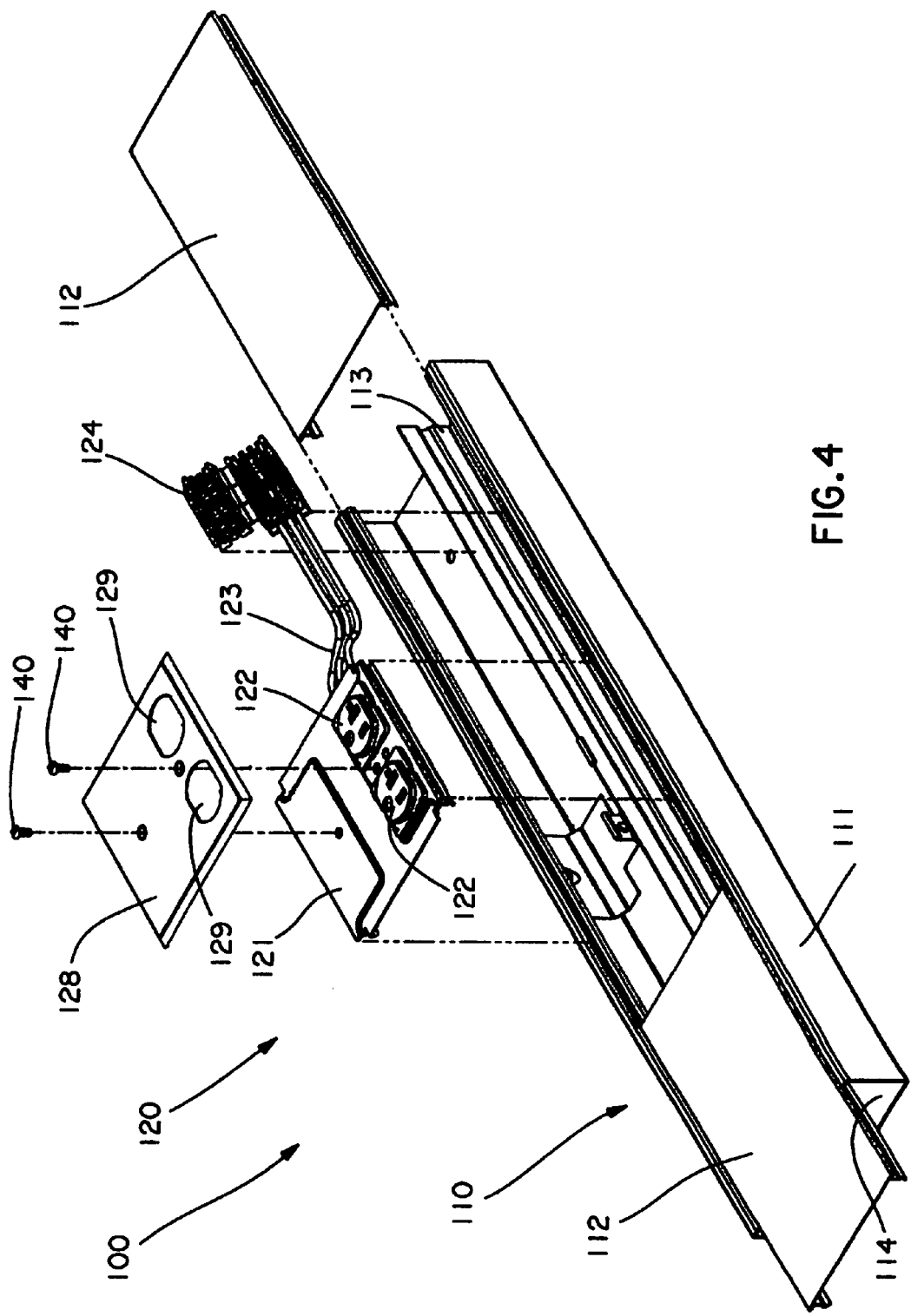
FIG. 4 is an exploded top front perspective view of the raceway of FIG. 1, with the faceplate, the raceway covers, and the pre-terminated outlet assembly removed therefrom.

FIG. 4 is an exploded top front perspective view of the raceway 110 of FIG. 1, with the faceplate 128, the raceway covers 112, and the pre-terminated outlet assembly 120 removed therefrom. As best seen in FIG. 4, the pre-terminated outlet assembly 120 is removably connected to the raceway 110.

Figure 5:
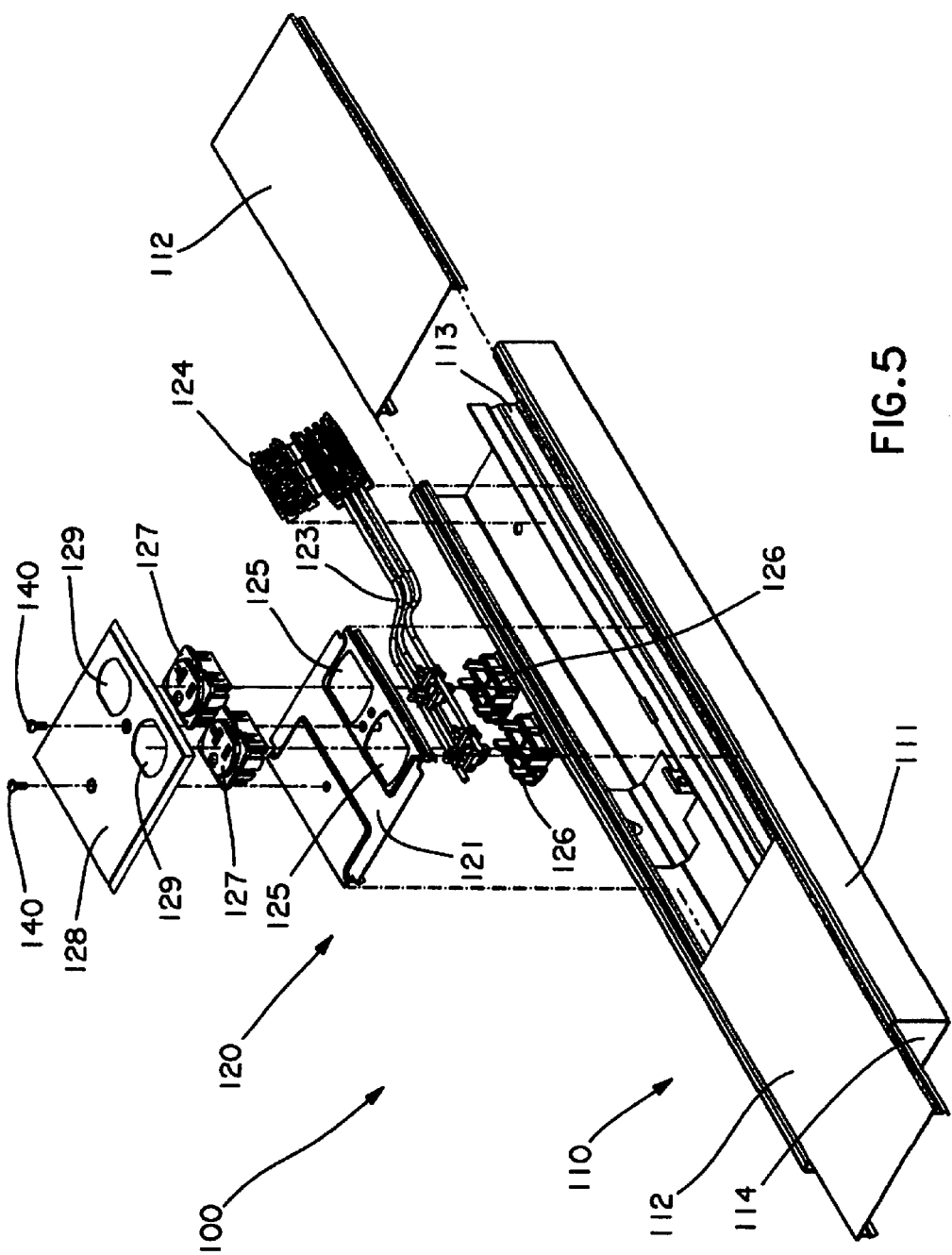
FIG. 5 is an exploded top front perspective view of the pre-terminated outlet assembly of FIG. 1.

FIG. 5 is an exploded top front perspective view of the pre-terminated outlet assembly 120 of FIG. 1. As best seen in FIG. 5, the pre-terminated outlet assembly 120 includes a device bracket 121, the one or more electrical outlets 122, a plurality of electrical conductors 123, and an electrical connector 124.

As described above, the pre-terminated outlet assembly 120 is removably connected to the raceway 110. More particularly, the device bracket 121 is removably connected to the base 111 of the raceway 110, for example, using snap-fit features. The device bracket 121 includes one or more openings 125. The one or more openings 125 of the device bracket 121 are adapted to receive the one or more electrical outlets 122.

The one or more electrical outlets 122 are connected to the device bracket 121. Each of the one or more electrical outlets 122 includes a base 126 and a cover 127. The base 126 is connected to the cover 127, and the device bracket 121 is positioned therebetween. For example, as best seen in FIG. 5, the base 126 is snap-fit into the cover 127, and the cover 127 is snap-fit into the openings 125 of the device bracket 121.

The plurality of electrical conductors 123 is pre-terminated at the one or more electrical outlets 122 and/or at the electrical connector 124. That is, the plurality of electrical conductors 123 is electrically connected to the one or more outlets 122, such as TYCO/AMP P/N 1445199-1 and/or QUALTEK P/N 739W-X2/20, and/or the electrical connector 124, such as 3M P/N 567 and/or WAGO P/N 222-413, prior to installation of the pre-terminated outlet assembly 120. For example, as best seen in FIG. 5, three electrical conductors 123 (e.g., a live or hot wire, a neutral wire, and an earth or ground wire) are connected to two electrical outlets 122 in series, and to one electrical connector 124, for example, using one or more insulation displacement connectors ("IDC's"). Alternatively, the plurality of electrical conductors 123 may be terminated at the time of installation. For example, one or more wires may be spliced using twist-on wire connectors.

FIGS. 6-9 illustrate a pre-terminated outlet assembly 220 installed in a multi-channel metal raceway 210, such as the PAN-WAY® PMR40 Multi-Channel Metal Raceway System (Panduit Corporation, Tinley Park. Ill.), according to a second preferred embodiment 200 of the present invention. The pre-terminated outlet assembly 220 is similar to the pre-terminated outlet assembly 120 of FIGS. 1-5, except the pre-terminated outlet assembly 220 does not include a faceplate, such as the faceplate 128 of FIGS. 1-5.

Figure 6:
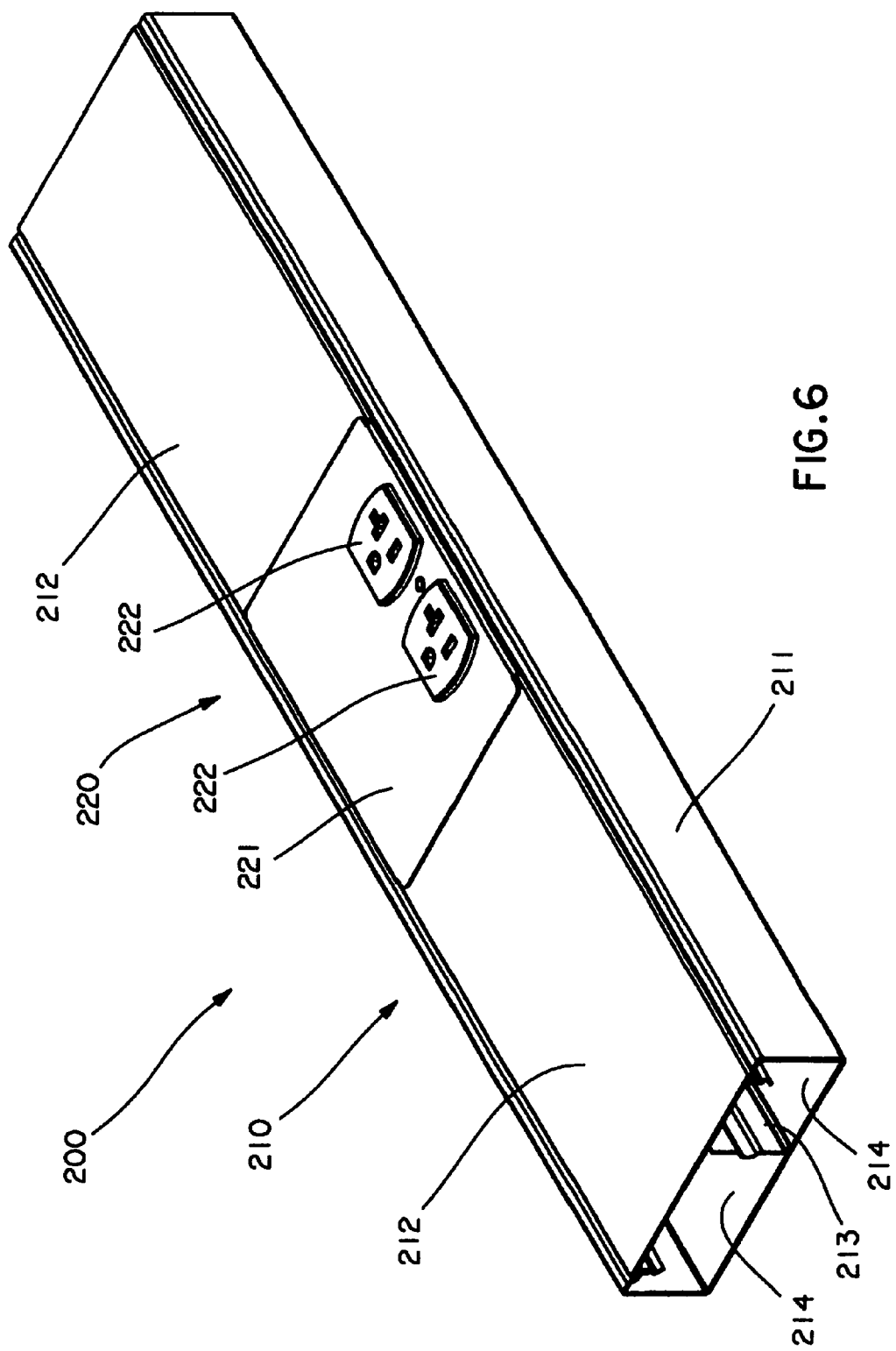
FIG. 6 is a top front perspective view of a pre-terminated outlet assembly installed in a multi-channel metal raceway according to a second preferred embodiment of the present invention.
Figure 7:
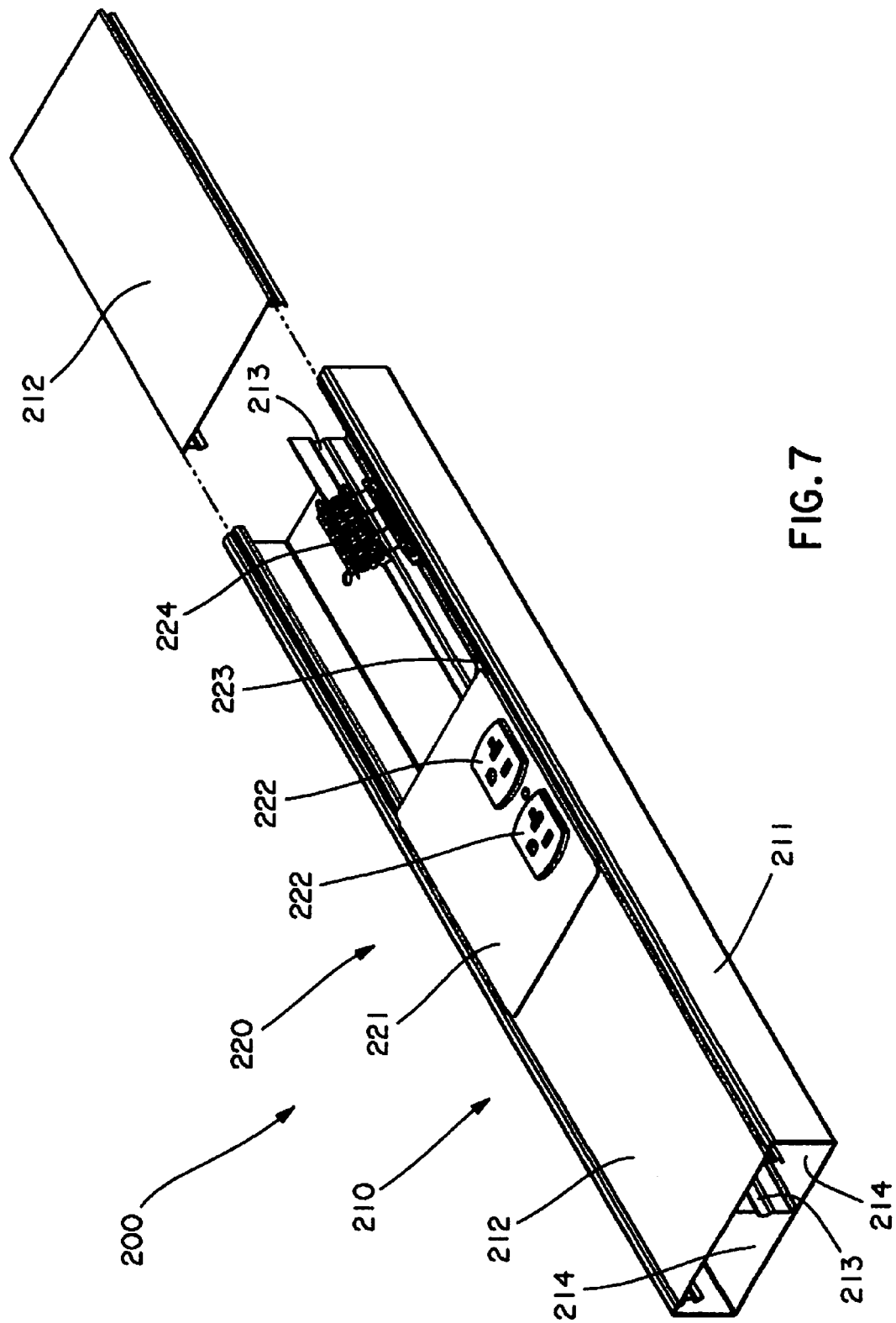
FIG. 7 is an exploded top front perspective view of the raceway of FIG. 6, with a raceway cover removed therefrom.
Figure 8:
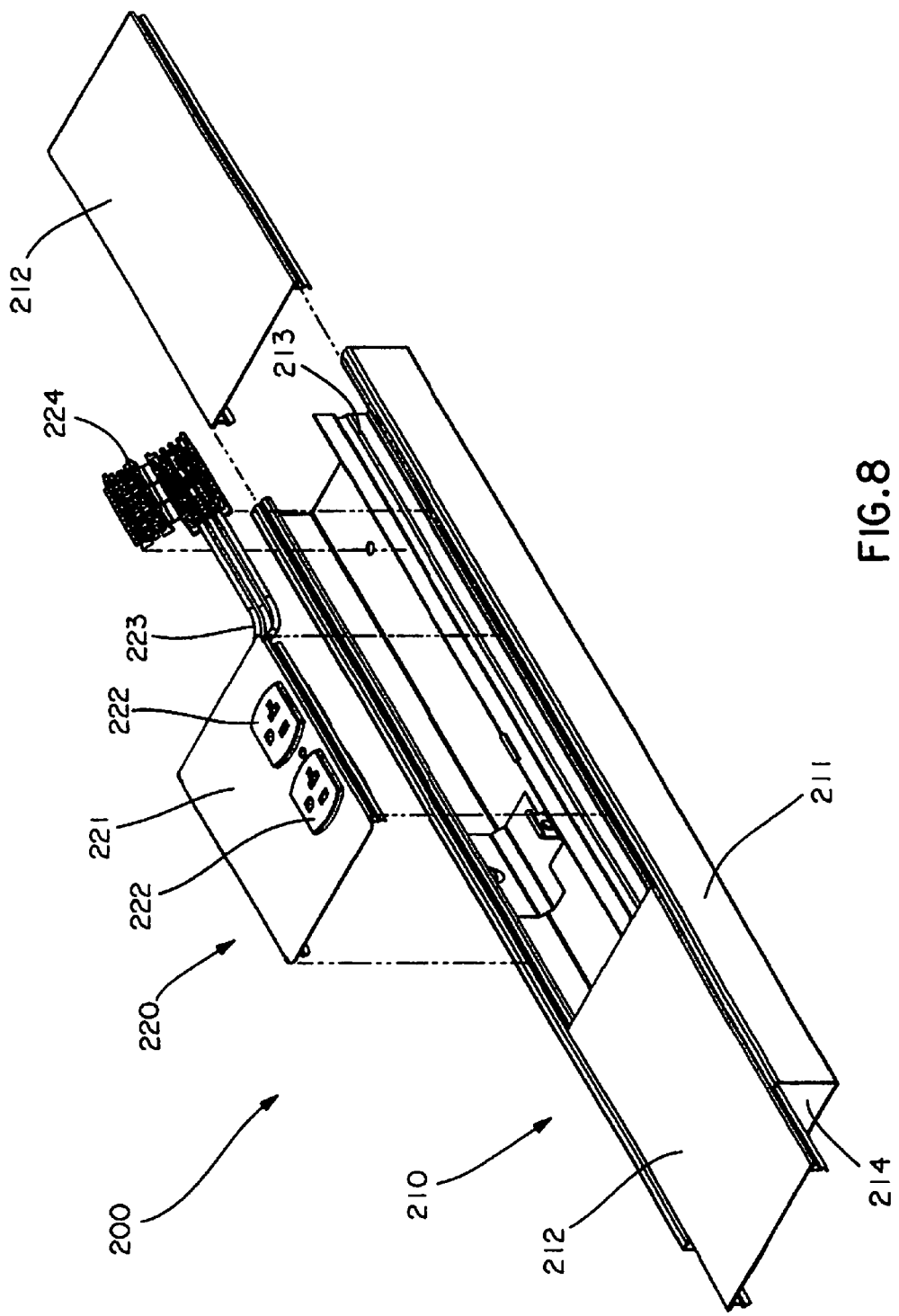
FIG. 8 is an exploded top front perspective view of the raceway of FIG. 6 with the raceways covers and the pre-terminated outlet assembly removed therefrom.

FIG. 6 is a top front perspective view of the pre-terminated outlet assembly 220 installed in the multi-channel metal raceway 210 according to the second preferred embodiment 200 of the present invention. As best seen in FIG. 6, the raceway 210 includes a base 211 and one or more covers 212. The raceway 210 also includes a divider 213. The components 211-213 of the raceway 210 are similar to the components 111-113 of the raceway 110 of FIGS. 1-5, which are described above in more detail.

Figure 9:
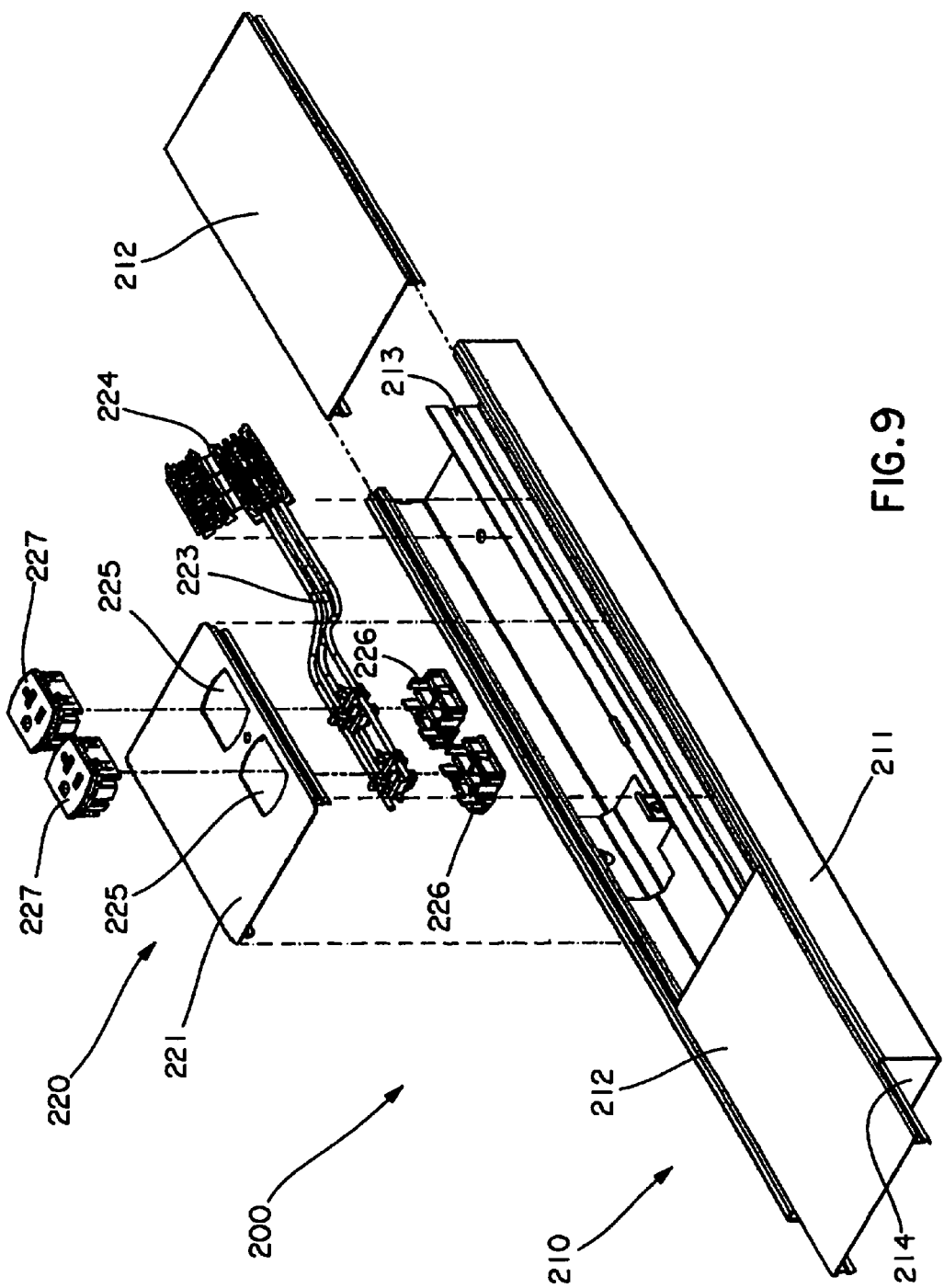
FIG. 9 is an exploded top front perspective view of the pre-terminated outlet assembly of FIG. 6.

FIG. 9 is an exploded top front perspective view of the pre-terminated outlet assembly 220 of FIG. 6. As best seen in FIG. 9, the pre-terminated outlet assembly 220 includes a device bracket 221, one or more electrical outlets 222, a plurality of electrical conductors 223, and an electrical connector 224. The device bracket 221 includes one or more openings 225. Each of the one or more electrical outlets 222 includes a base 226 and a cover 227. The components 221-227 of the pre-terminated outlet assembly 220 are similar to the respective components 121-127 of the pre-terminated outlet assembly 120 of FIGS. 1-5, which are described above in more detail.

As described above, the pre-terminated outlet assembly 220 does not include a faceplate, such as the faceplate 128 of FIGS. 1-5. Rather, the device bracket 221 is a combination of the device bracket 121 of FIGS. 1-5 and the faceplate 128. That is, the device bracket 221 performs the same functions as a faceplate and/or a raceway cover. Therefore, the device bracket 221 may be referred to as a device bracket, a faceplate, and/or a raceway cover, depending on the intended use thereof.

FIGS. 10-13 illustrate a pre-terminated outlet assembly 320 installed in a non-metallic raceway 310, such as the PAN-WAY® T-70 Non-Metallic Raceway System (Panduit Corporation, Tinley Park, Ill.), according to a third preferred embodiment 300 of the present invention. The pre-terminated outlet assembly 320 is similar to the pre-terminated outlet assembly 120 of FIGS. 1-5, except the pre-terminated outlet assembly 320 is installed in the non-metallic raceway 310, rather than the multi-channel metal raceway 110 of FIGS. 1-5.

Figure 10:
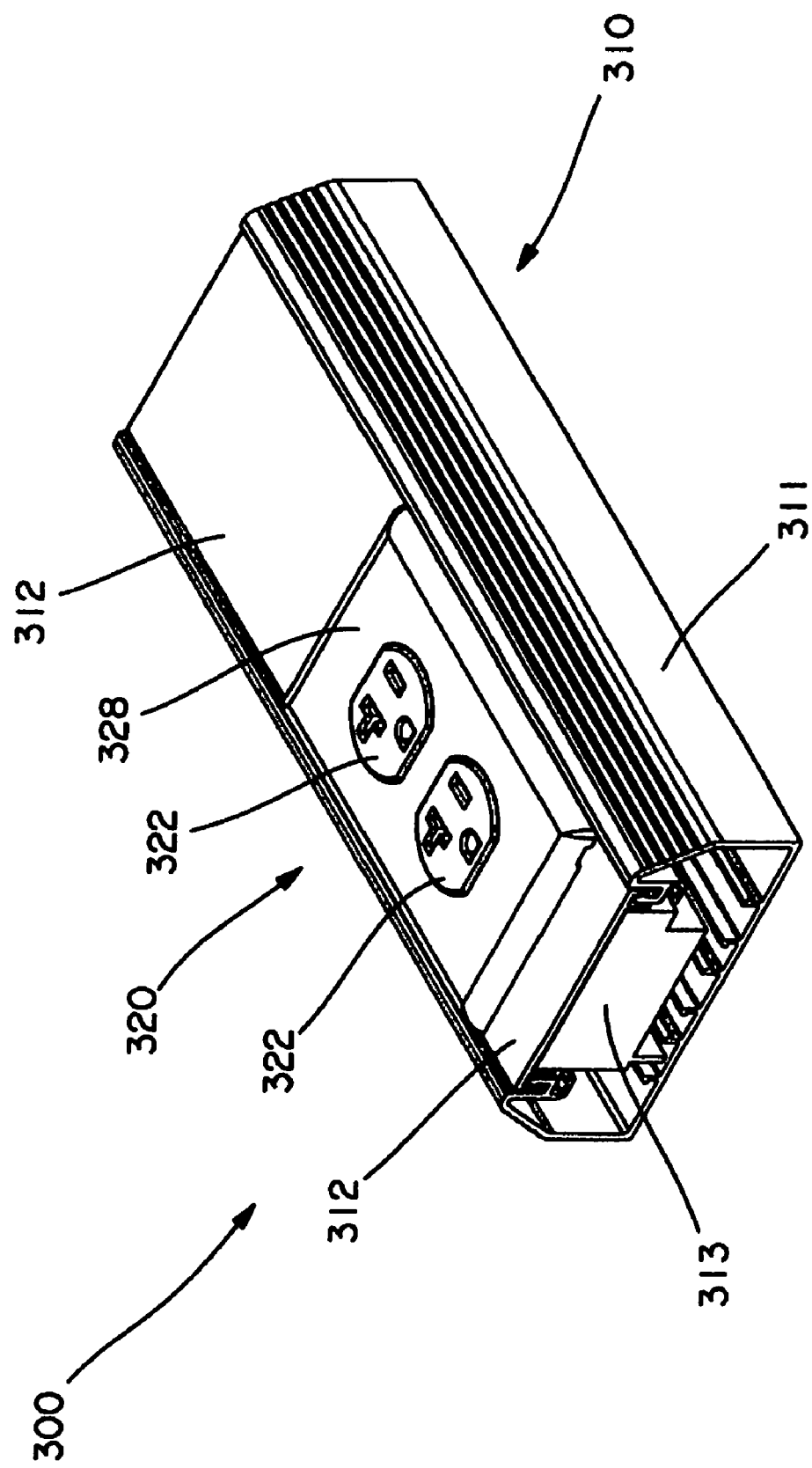
FIG. 10 is a top front perspective view of a pre-terminated outlet assembly installed in a non-metallic raceway according to a third preferred embodiment of the present invention.

FIG. 10 is a top front perspective view of the pre-terminated outlet assembly 320 installed in the non-metallic raceway 310 according to the third preferred embodiment 300 of the present invention. As best seen in FIG. 10, the raceway 310 includes a base 311 and one or more covers 312. The raceway 310 also includes a three-sided hanging box 313. The hanging box 313 is connected to the raceway 310, for example, using snap-fit features. The pre-terminated outlet assembly 320 includes a faceplate 328.

Figure 11:
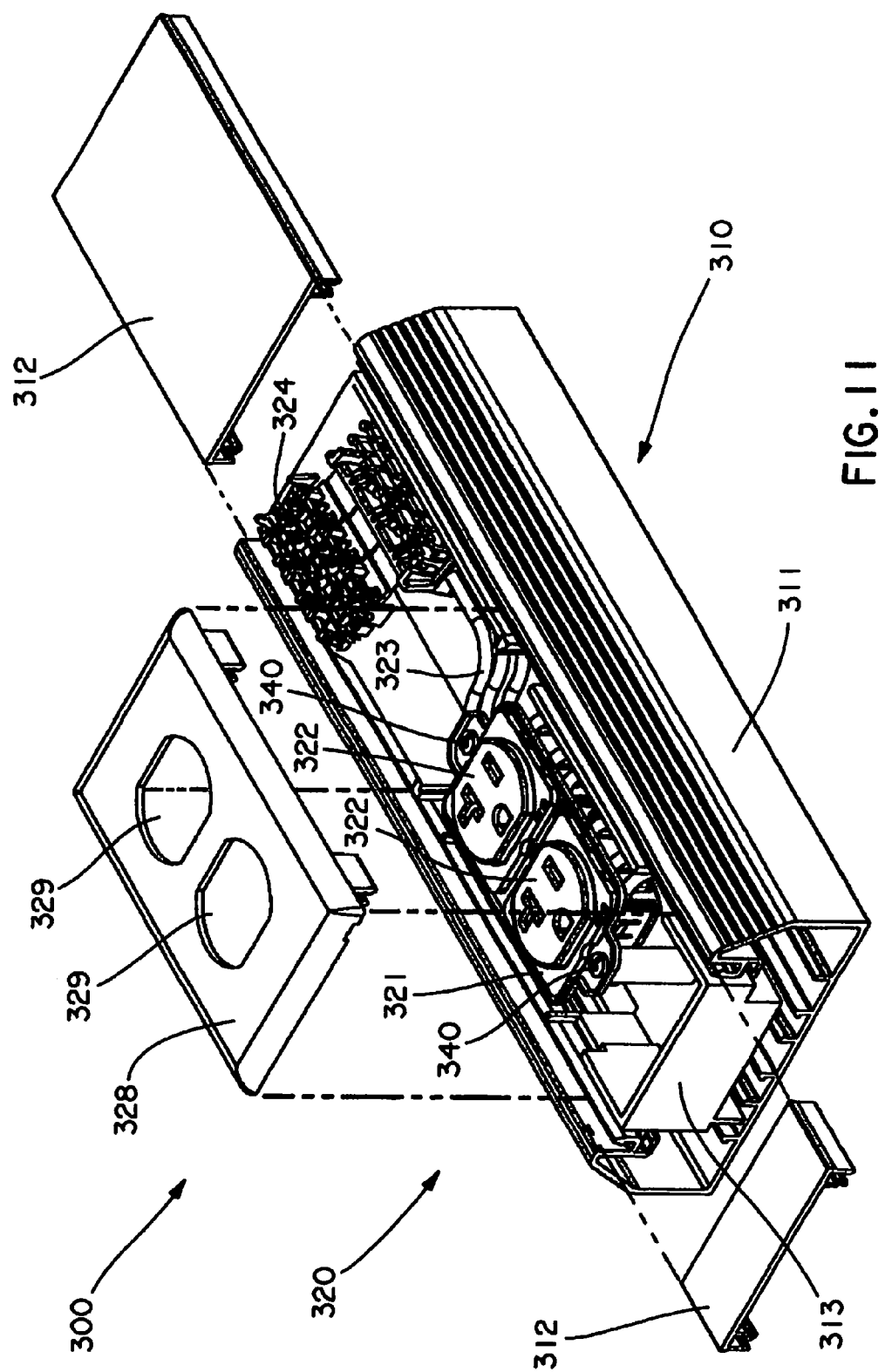
FIG. 11 is an exploded top front perspective view of the raceway of FIG. 10, with the faceplate and the raceway covers removed therefrom.

FIG. 11 is an exploded top front perspective view of the raceway 310 of FIG. 10, with the faceplate 328 and the raceway covers 312 removed therefrom. As best seen in FIG. 11, the faceplate 328 is connected to the raceway 310, for example, using one or more snap-fit features. The faceplate 328 includes one or more openings 329. The one or more openings 329 of the faceplate 328 are adapted to receive one or more electrical outlets 322. The faceplate 329 covers a portion of the raceway 310, as well as the pre-terminated outlet assembly 320. The faceplate 328 and the one or more covers 312 are removable allowing access to the raceway 310 without disturbing the pre-terminated outlet assembly 310.

Figure 12:
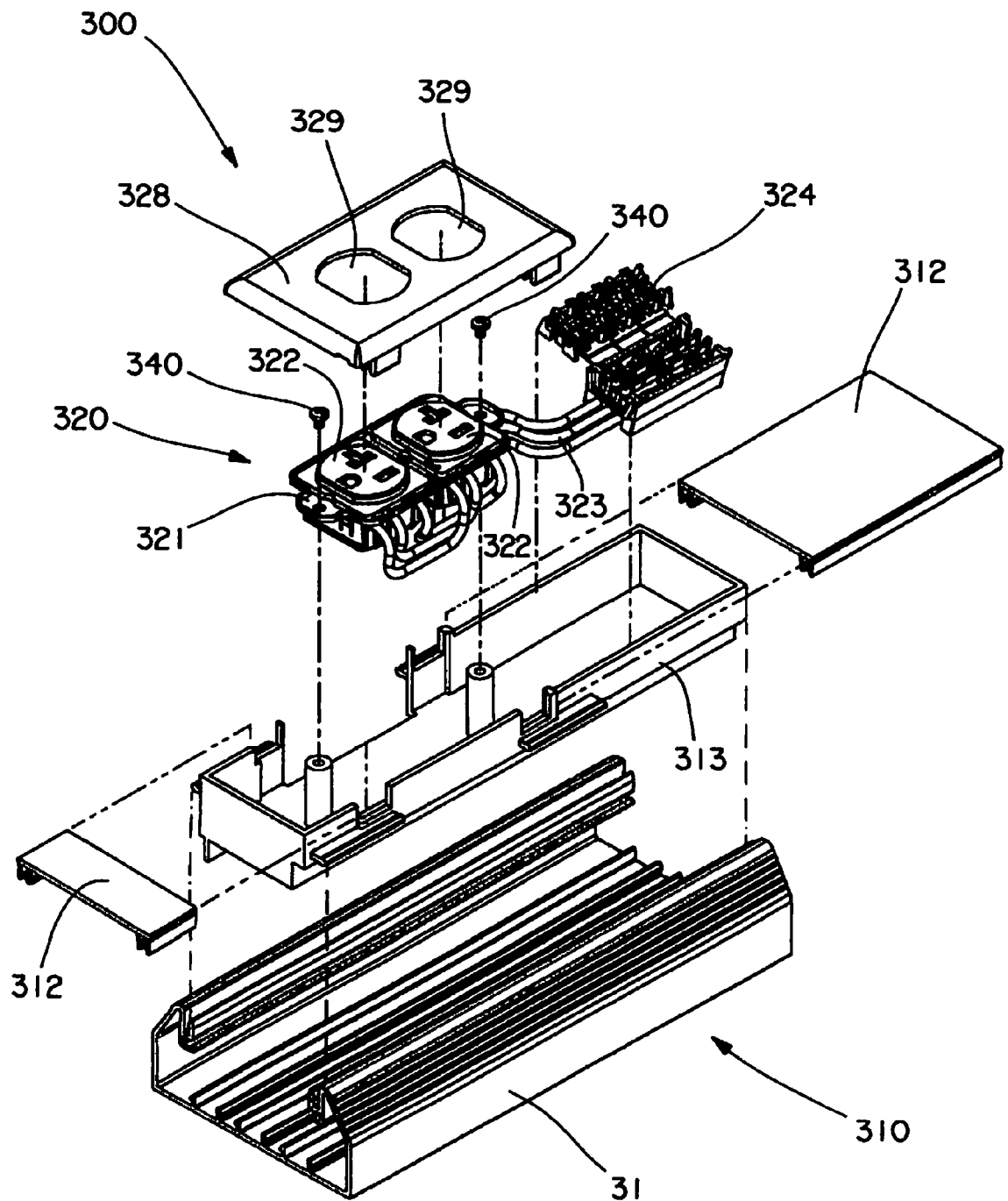
FIG. 12 is an exploded top front perspective view of the raceway of FIG. 10, with the faceplate, the raceway covers, the pre-terminated outlet assembly, and the hanging box removed therefrom.

FIG. 12 is an exploded top front perspective view of the raceway 310 of FIG. 10, with the faceplate 328, the raceway covers 312, the pre-terminated outlet assembly 320, and the hanging box 313 removed therefrom. As best seen in FIG. 12, the pre-terminated outlet assembly 320 is removably connected to the raceway 310.

Figure 13:
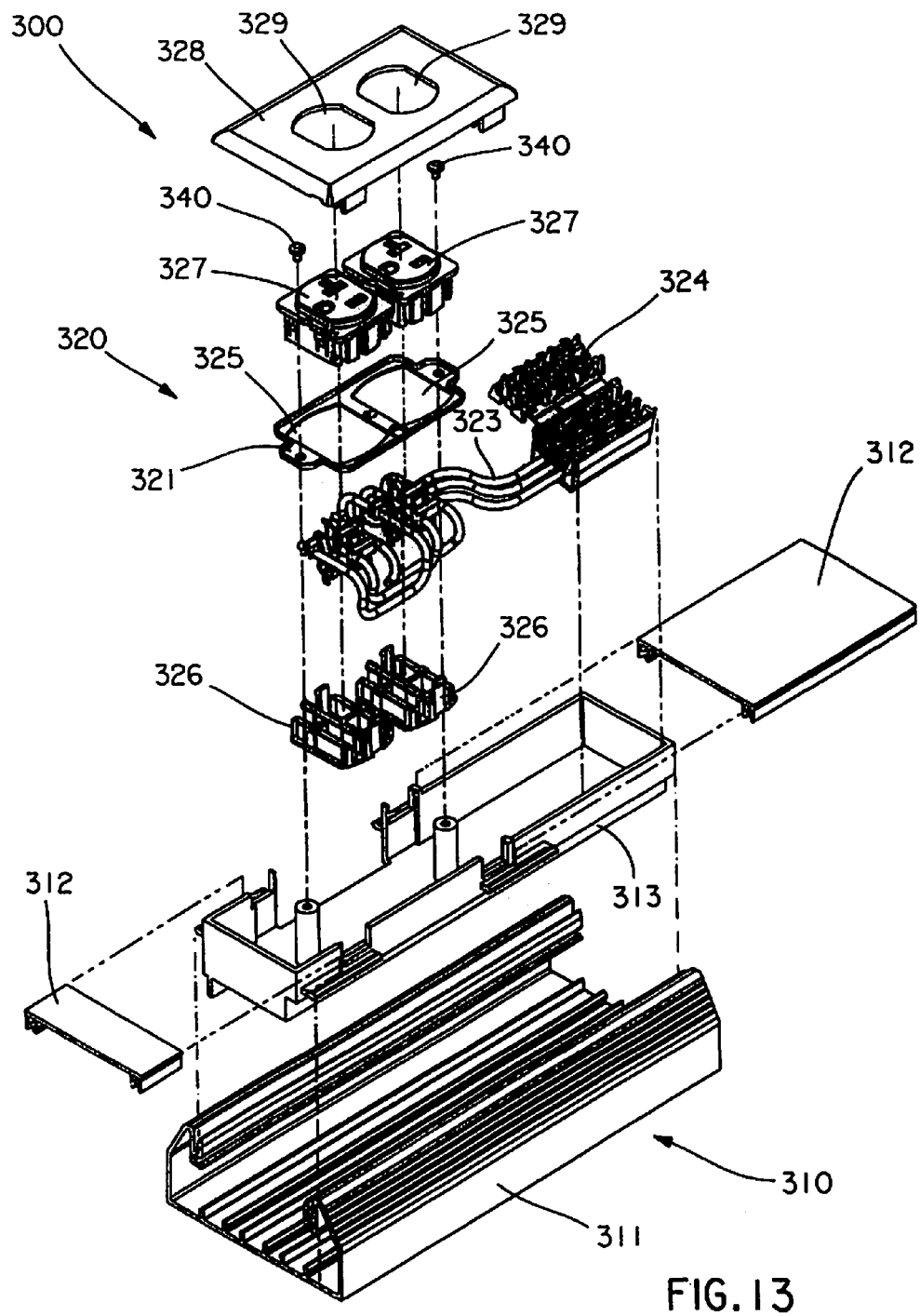
FIG. 13 is an exploded top front perspective view of the pre-terminated outlet assembly of FIG. 10.

FIG. 13 is an exploded top front perspective view of the pre-terminated outlet assembly 320 of FIG. 10. As best seen in FIG. 13, the pre-terminated outlet assembly 320 includes a device bracket 321, one or more electrical outlets 322, a plurality of electrical conductors 323, and an electrical connector 324. The device bracket 321 includes one or more openings 325. Each of the one or more electrical outlets 322 includes a base 326 and a cover 327. The components 321-329 of the pre-terminated outlet assembly 320 are similar to the respective components 121-129 of FIGS. 1-5, which are described above in more detail.

As described above, the pre-terminated outlet assembly 320 is removably connected to the raceway 310. More particularly, the device bracket 321 of the pre-terminated outlet assembly 320 is removably connected to the hanging box 313 of the raceway 310, for example, using one or more fasteners 340, such as screws.

Figure 14:
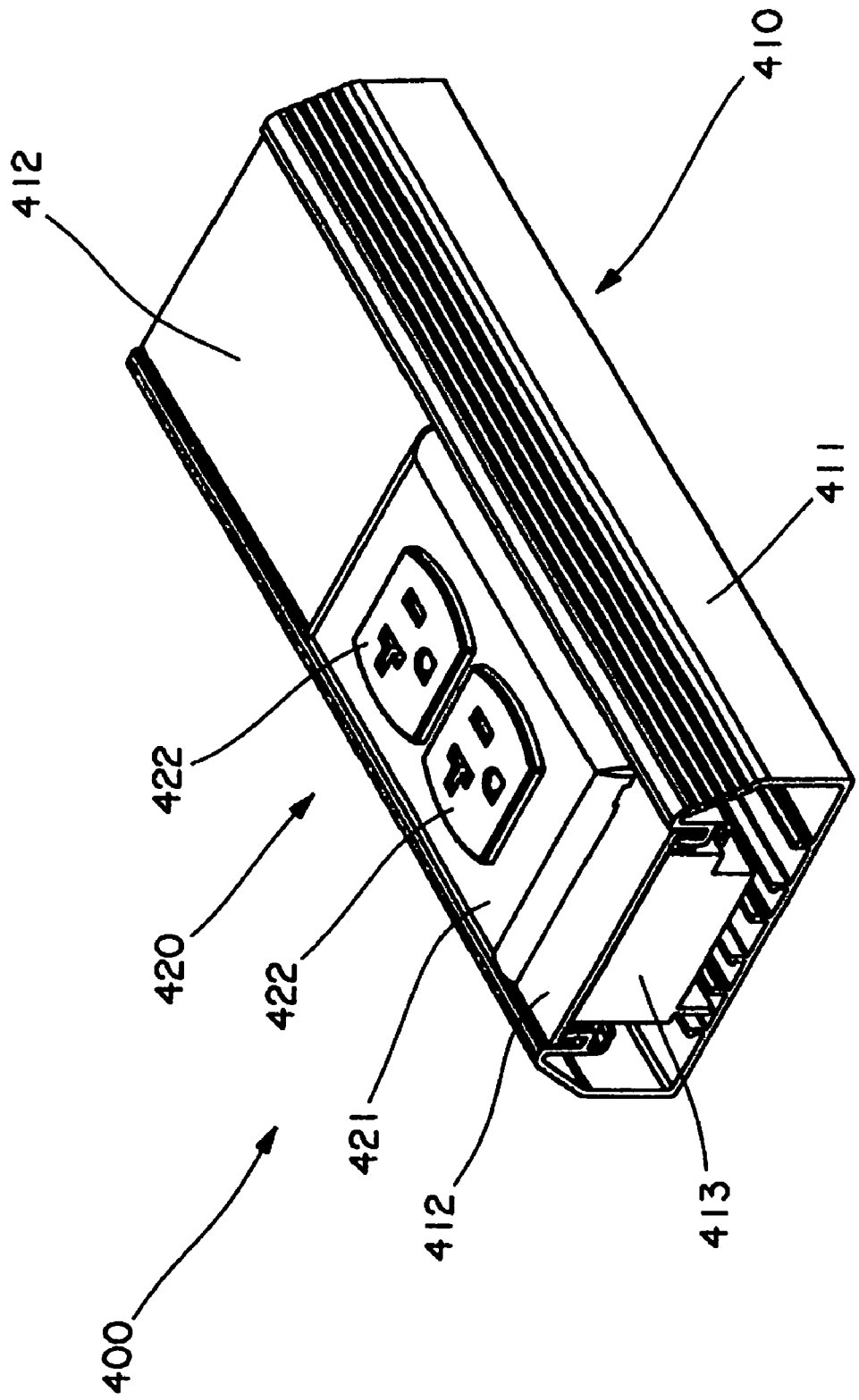
FIG. 14 is a top front perspective view of a pre-terminated outlet assembly installed in a non-metallic raceway according to a fourth preferred embodiment of the present invention.
Figure 15:
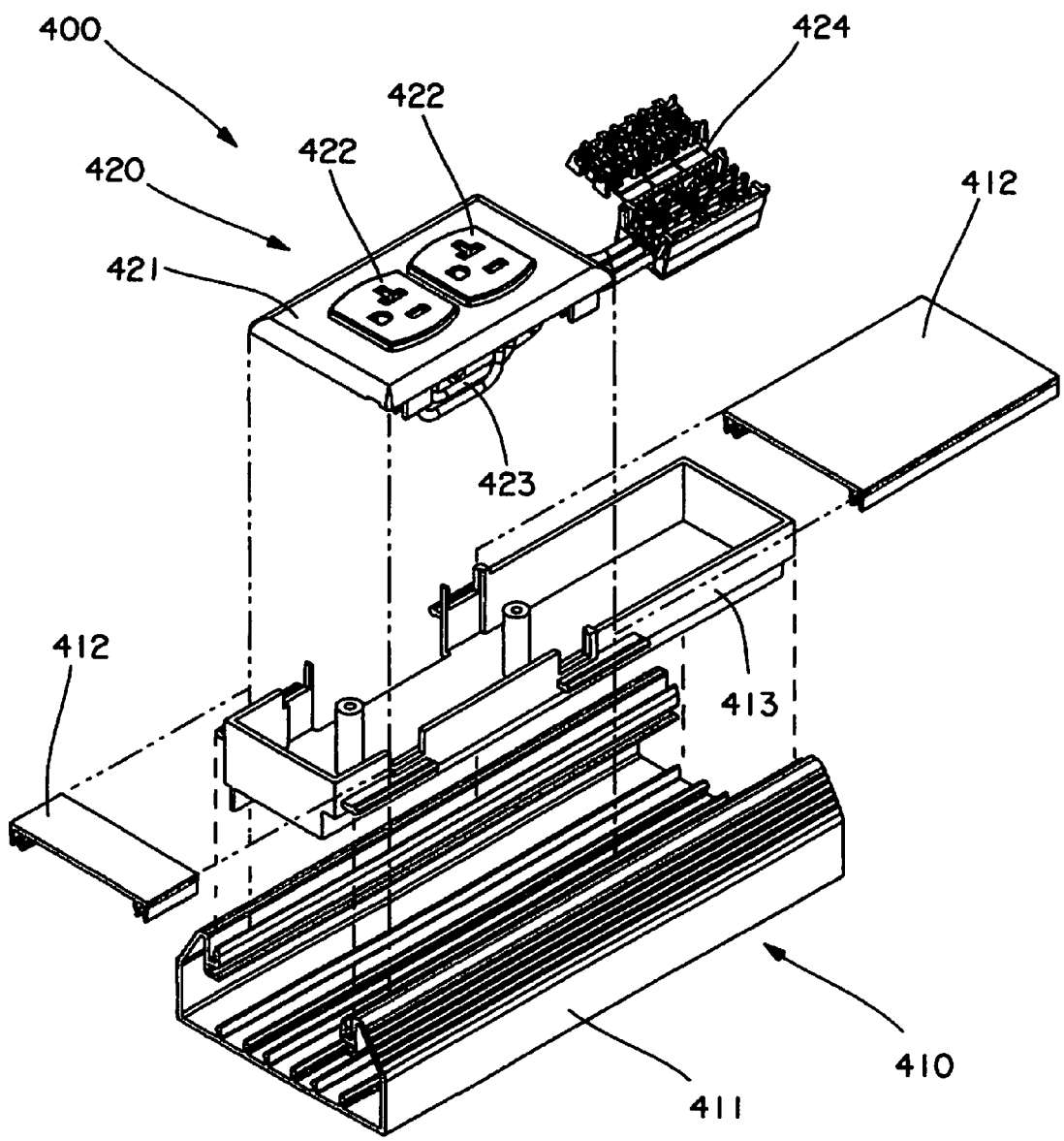
FIG. 15 is an exploded top front perspective view of the raceway of FIG. 14, with the raceway covers, the pre-terminated outlet assembly, and the hanging box removed therefrom.
Figure 16:
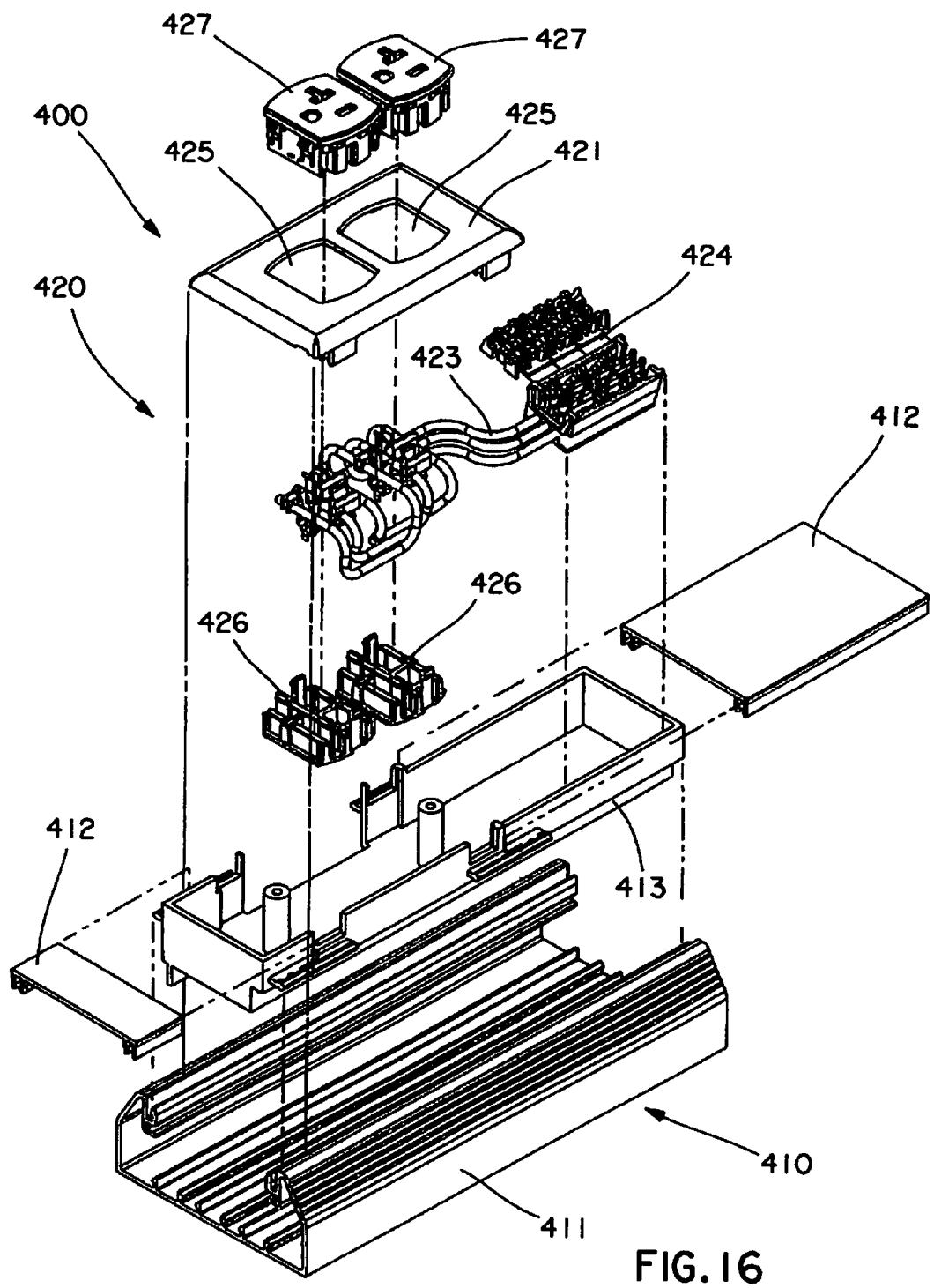
FIG. 16 is an exploded top front perspective view of the pre-terminated outlet assembly of FIG. 14.

FIGS. 14-16 illustrate a pre-terminated outlet assembly 420 installed in a non-metallic raceway 410, such as the PAN-WAY® T-70 Non-Metallic Surface Raceway System (Panduit Corporation, Tinley Park. Ill.), accordingly to a fourth preferred embodiment 400 of the present invention. The pre-terminated outlet assembly 420 is similar to the pre-terminated outlet assembly 320 of FIGS. 10-13, except the pre-terminated outlet assembly 420 does not include a faceplate, such as the faceplate 328 of FIGS. 10-13.

FIG. 14 is a top front perspective view of the pre-terminated outlet assembly 420 installed in the non-metallic raceway 410 according to the fourth preferred embodiment 400 of the present invention. As best seen in FIG. 15, the raceway 410 includes a base 411 and one or more covers 412. The raceway 410 also includes a hanging box 413. The components 411-413 of the raceway 410 are similar to the respective components 311-313 of FIGS. 10-13, which are described above in more detail.

FIG. 16 is an exploded top front perspective view of the pre-terminated outlet assembly 420 of FIG. 14. As best seen in FIG. 16, the pre-terminated outlet assembly 420 includes a device bracket 421, one or more electrical outlets 422, a plurality of electrical conductors 423, and an electrical connector 424. The device bracket 421 includes one or more openings 425. Each of the one or more electrical outlets 422 includes a base 426 and a cover 427. The components 421-427 of the pre-terminated outlet assembly 420 are similar to the respective components 321-327 of FIGS. 10-13, which are described above in more detail.

As described above, the pre-terminated outlet assembly 420 does not include a faceplate, such as the faceplate 328 of FIGS. 10-13. Rather, the device bracket 421 is a combination of the device bracket 321 of FIGS. 10-13 and the faceplate 328. That is, the device bracket 421 performs the same functions as a faceplate and/or a raceway cover. Therefore, the device bracket 421 may be referred to as a device bracket, a faceplate, and/or a raceway cover, depending on the intended use thereof.

FIGS. 17-21 illustrate a pre-terminated outlet assembly 520 installed in a single-channel metal raceway 510, such as the PAN-WAY® PMR5/PMR7 Single-Channel Metal Raceway System (Panduit Corporation, Tinley Park, Ill.), according to a fifth preferred embodiment 500 of the present invention. The pre-terminated outlet assembly 520 is similar to the pre-terminated outlet assembly 320 of FIGS. 1-13, except the pre-terminated outlet assembly 520 is installed in a single-channel metal raceway 510, rather than the multi-channel metal raceway 310 of FIGS. 10-13.

Figure 17:
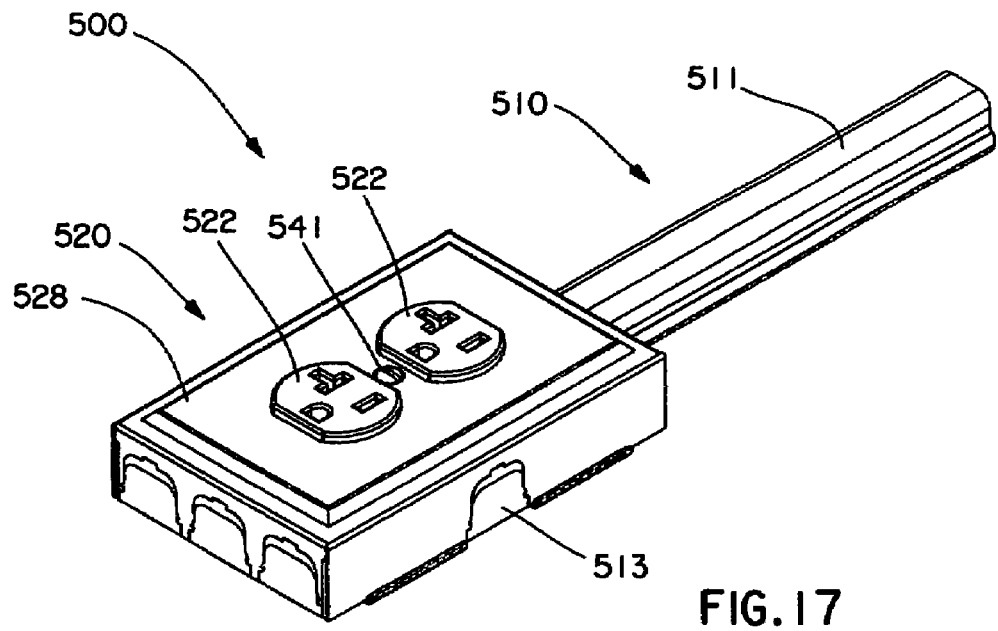
FIG. 17 is a top front perspective view of a pre-terminated outlet assembly installed in a single-channel metal raceway according to a fifth preferred embodiment of the present invention.

FIG. 17 is a top front perspective view of the pre-terminated outlet assembly 520 installed in the single-channel metal raceway 510 according to a fifth preferred embodiment 500 of the present invention. As best seen in FIG. 17, the raceway 510 includes a single-gang outlet box 513. The pre-terminated outlet assembly 520 is connected to the outlet box 513. The pre-terminated outlet assembly 520 includes a faceplate 528.

Figure 18:
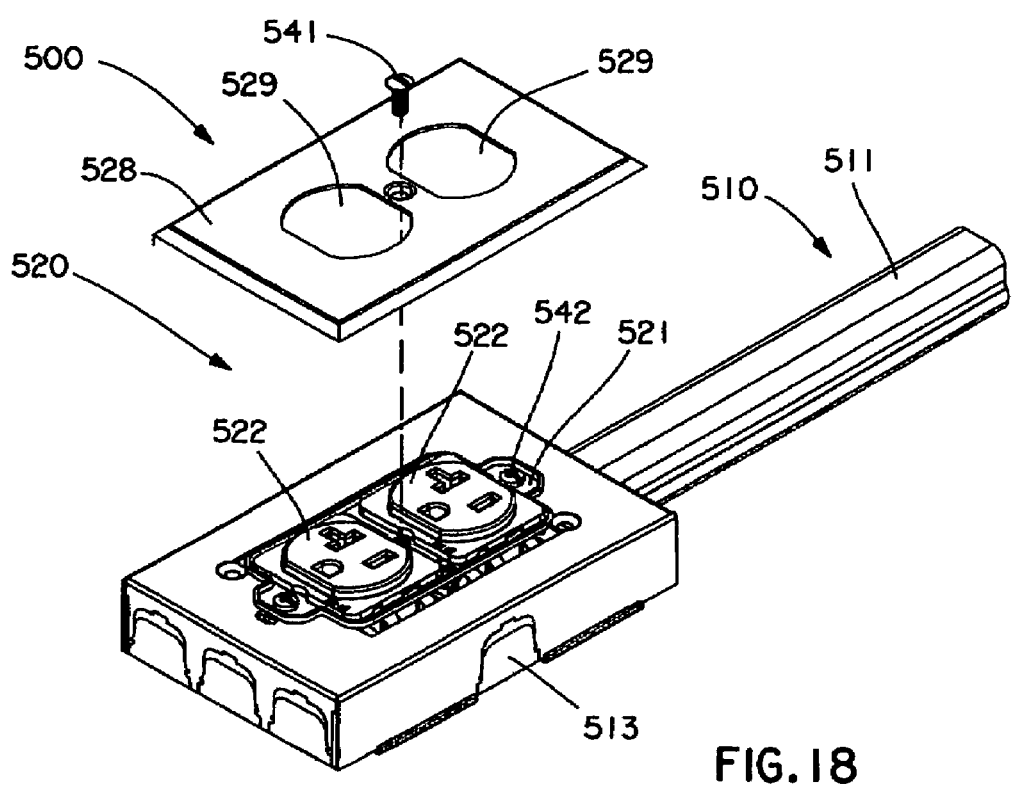
FIG. 18 is an exploded top front perspective view of the raceway of FIG. 17, with the faceplate removed therefrom.

FIG. 18 is an exploded top front view of the raceway 510 of FIG. 17, with the faceplate 528 removed therefrom. As best seen in FIG. 18, the faceplate 528 is connected to the outlet box 513, for example, using one or more fasteners 541, such as screws. The faceplate 528 includes one or more openings 529. The one or more openings 529 of the faceplate 528 are adapted to receive one or more electrical outlets 522.

Figure 19:
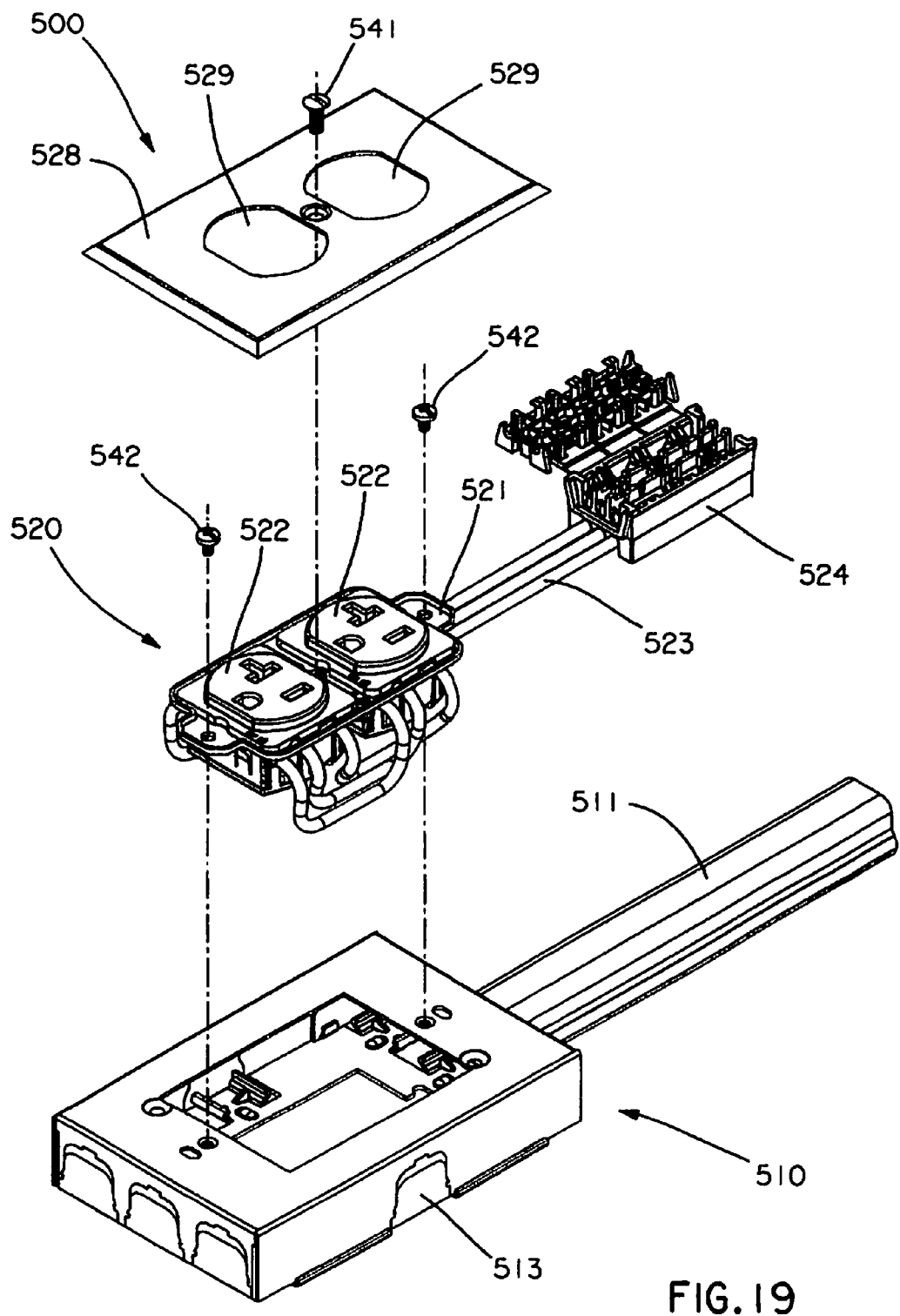
FIG. 19 is an exploded top front perspective view of the raceway of FIG. 17, with the faceplate and the pre-terminated outlet assembly removed therefrom.

FIG. 19 is an exploded top front perspective view of the raceway 510 of FIG. 17, with the faceplate 528 and the pre-terminated outlet assembly 520 removed therefrom. As best seen in FIG. 19, the pre-terminated outlet assembly 520 is removably connected to the raceway 510.

Figure 20:
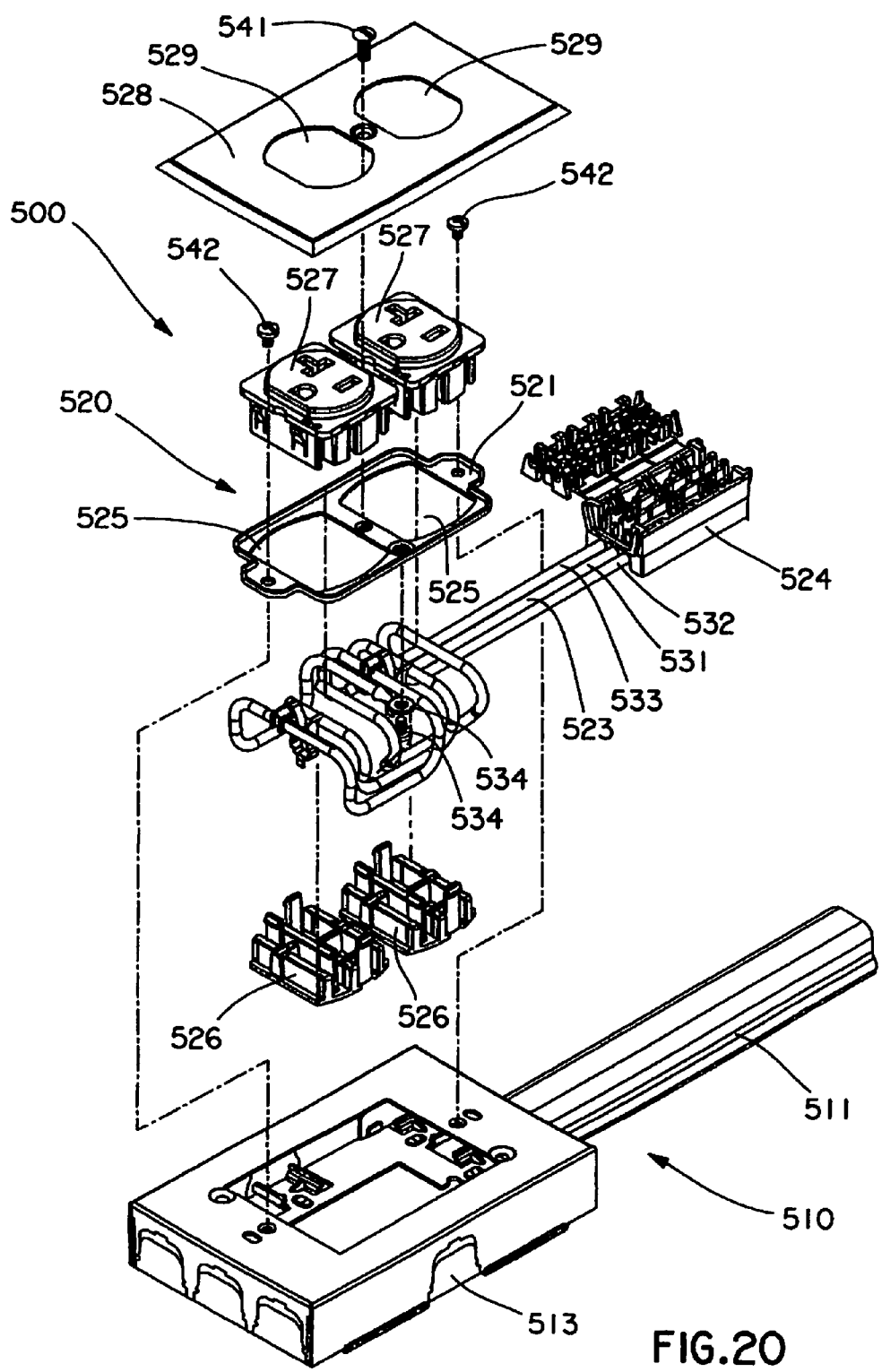
FIG. 20 is an exploded top front perspective view of the pre-terminated outlet assembly of FIG. 17.

FIG. 20 is an exploded top front perspective view of the pre-terminated outlet assembly 520 of FIG. 17. As best seen in FIG. 20, the pre-terminated outlet assembly 520 includes a device bracket 521, one or more electrical outlets 522, a plurality of electrical conductors 523, and an electrical connector 524. The device bracket 521 includes one or more openings 525. Each of the one or mole electrical outlets 522 includes a base 526 and a cover 527. The components 521-529 of the pre-terminated outlet assembly 520 are similar to the respective components 321-329 of the pre-terminated outlet assembly 320 of FIGS. 10-13, which are described above in more detail.

As described above, the pre-terminated outlet assembly 520 is removably connectable to the raceway 510. More particularly, the device bracket 521 is removably connectable to the outlet box 513 of the raceway 510, for example, using one or more fasteners 542, such as screws.

Additionally, as described above, the plurality of electrical conductors 523 may include a live or hot wire 531, a neutral wire 532, and an earth or ground wire 533.

Figure 21:
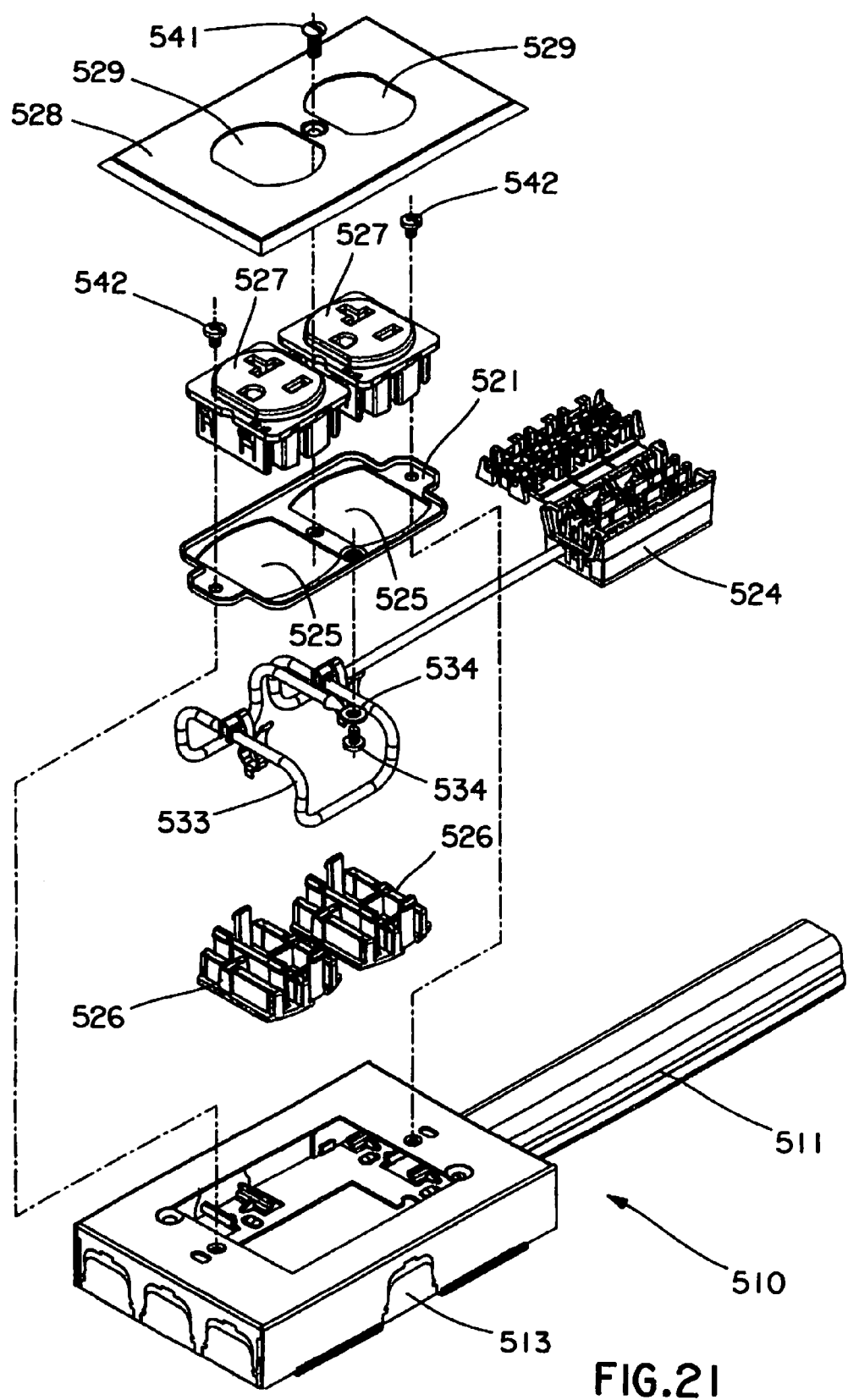
FIG. 21 is an exploded top front perspective view of the pre-terminated outlet assembly of FIG. 17, with the live or hot wire and the neutral wire removed therefrom.

FIG. 21 is an exploded top front perspective view of the pre-terminated outlet assembly 520 of FIG. 17, with the live or hot wire 531 and the neutral wire 532 removed therefrom. As best seen in FIG. 21, the earth or ground wire 533 is connected to the device bracket 521, for example, using one or more fasteners 534, such as screws and/or washers.

Figure 22:
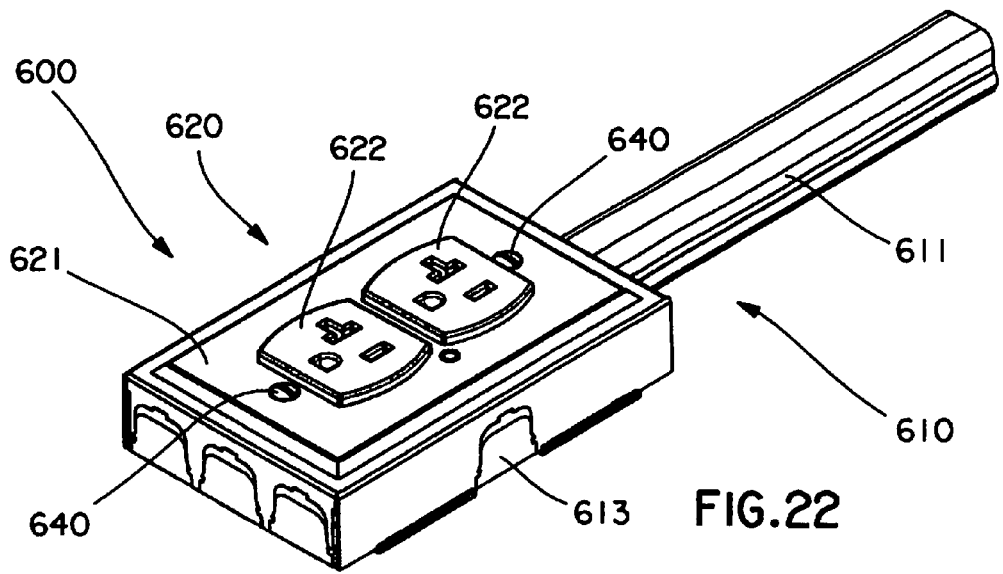
FIG. 22 is a top front perspective view of a pre-terminated outlet assembly installed in a single-channel metal raceway according to a sixth preferred embodiment of the present invention.
Figure 23:
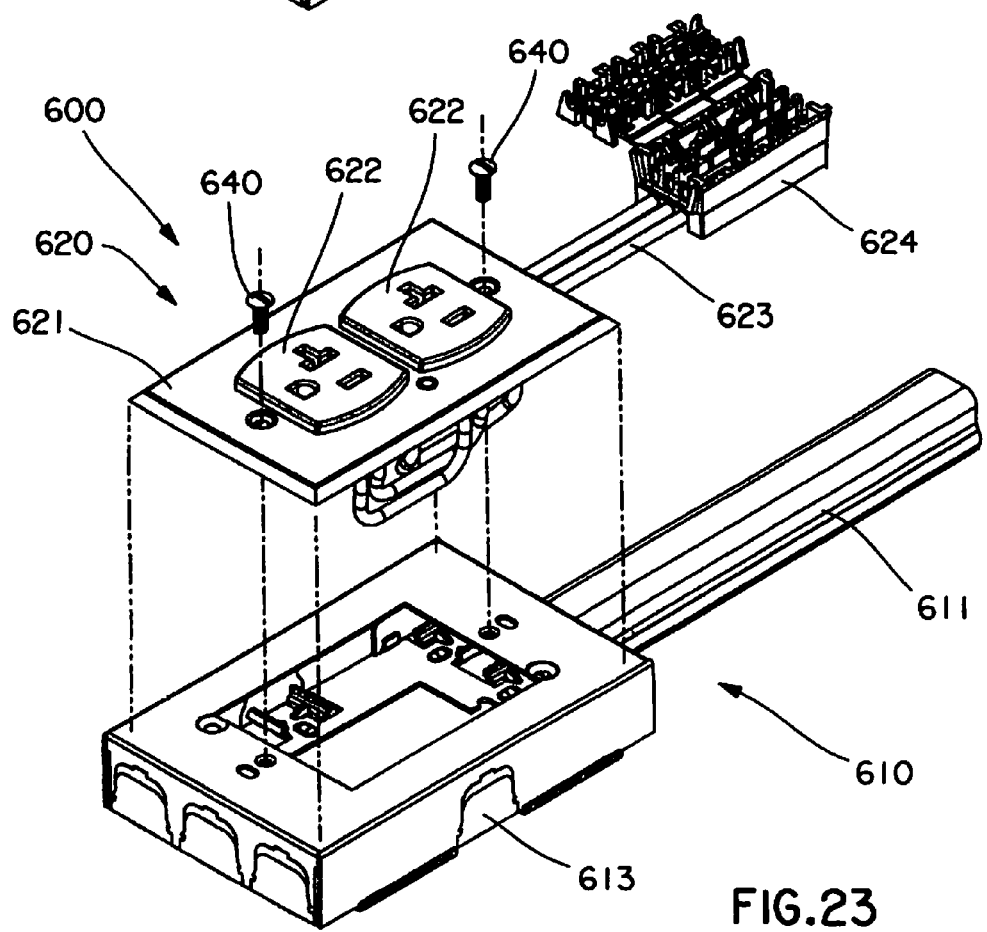
FIG. 23 is an exploded top front perspective view of the raceway of FIG. 22, with the pre-terminated outlet assembly removed therefrom.
Figure 24:
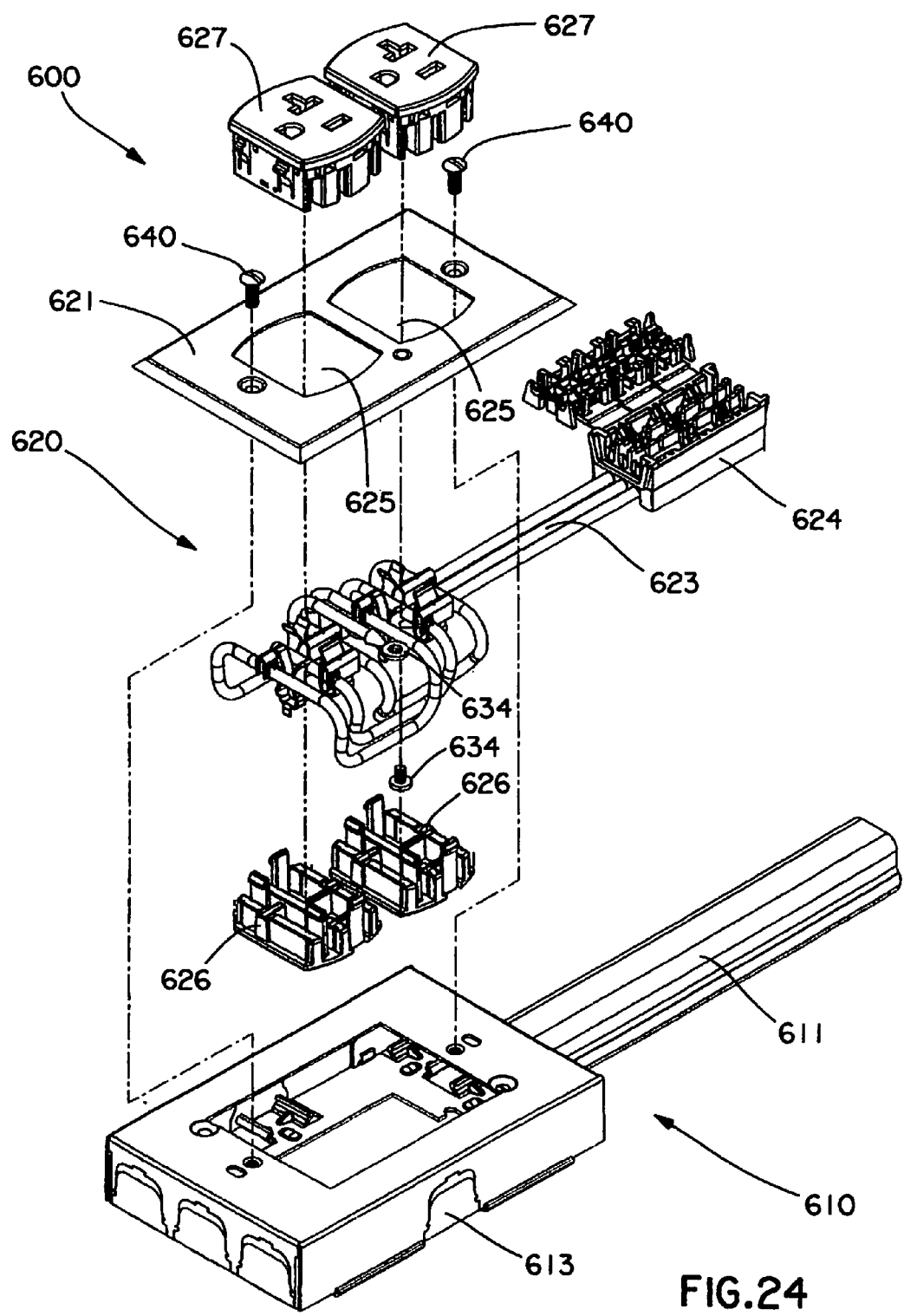
FIG. 24 is an exploded top front perspective view of the pre-terminated outlet assembly of FIG. 22.

FIGS. 22-24 illustrate a pre-terminated outlet assembly 620 installed in a single-channel metal raceway 610 according to a sixth preferred embodiment 600 of the present invention. The pre-terminated outlet assembly 620 is similar to the pre-terminated outlet assembly 520 of FIGS. 17-21, except that the pre-terminated outlet assembly 620 does not include a faceplate, such as the faceplate 528 of FIGS. 17-21.

FIG. 22 is a top front perspective view of the pre-terminated outlet assembly 620 installed in the single-channel metal raceway 610 according to the sixth preferred embodiment 600 of the present invention. As best seen in FIG. 22, the raceway 610 includes a single-gang outlet box 613. The components of the raceway 610 are similar to the respective components of the raceway 510 of FIGS. 17-21.

FIG. 24 is an exploded top front perspective view of the pre-terminated outlet assembly 620 of FIG. 22. As best seen in FIG. 24, the pre-terminated outlet assembly 620 includes a device bracket 621, one or more electrical outlets 622, a plurality of electrical conductors 623, and an electrical connector 624. The device bracket 621 includes one or more openings 625. Each of the one or more electrical outlets 622 includes a base 626 and a cover 627. The components 621-627 of the pre-terminated outlet assembly 620 are similar to the components 521-527 of the pre-terminated outlet assembly 520 of FIGS. 17-21, which are described above in more detail.

As described above, the pre-terminated outlet assembly 620 does not include a faceplate, such as the faceplate 528 of FIGS. 17-21. Rather, the device bracket 621 is a combination of the device bracket 521 of FIGS. 17-21 and the faceplate 528. That is, the device bracket 621 performs the same functions as a faceplate and/or a raceway cover. Therefore, the device bracket 621 may be referred to as a device bracket, a faceplate, and/or a raceway cover, depending on its intended use.

The preferred embodiments 100-500 of the present invention include two electrical outlets, one electrical connector, and three electrical conductors. It is likewise contemplated that the pre-terminated outlet assembly may include any number of electrical outlets, electrical connectors, and/or electrical conductors. It is also likewise contemplated that the pre-terminated outlet assembly may include other types of outlets, connectors, and/or conductors, such as outlets, connectors, and conductors for communicating data.

Figure 25:
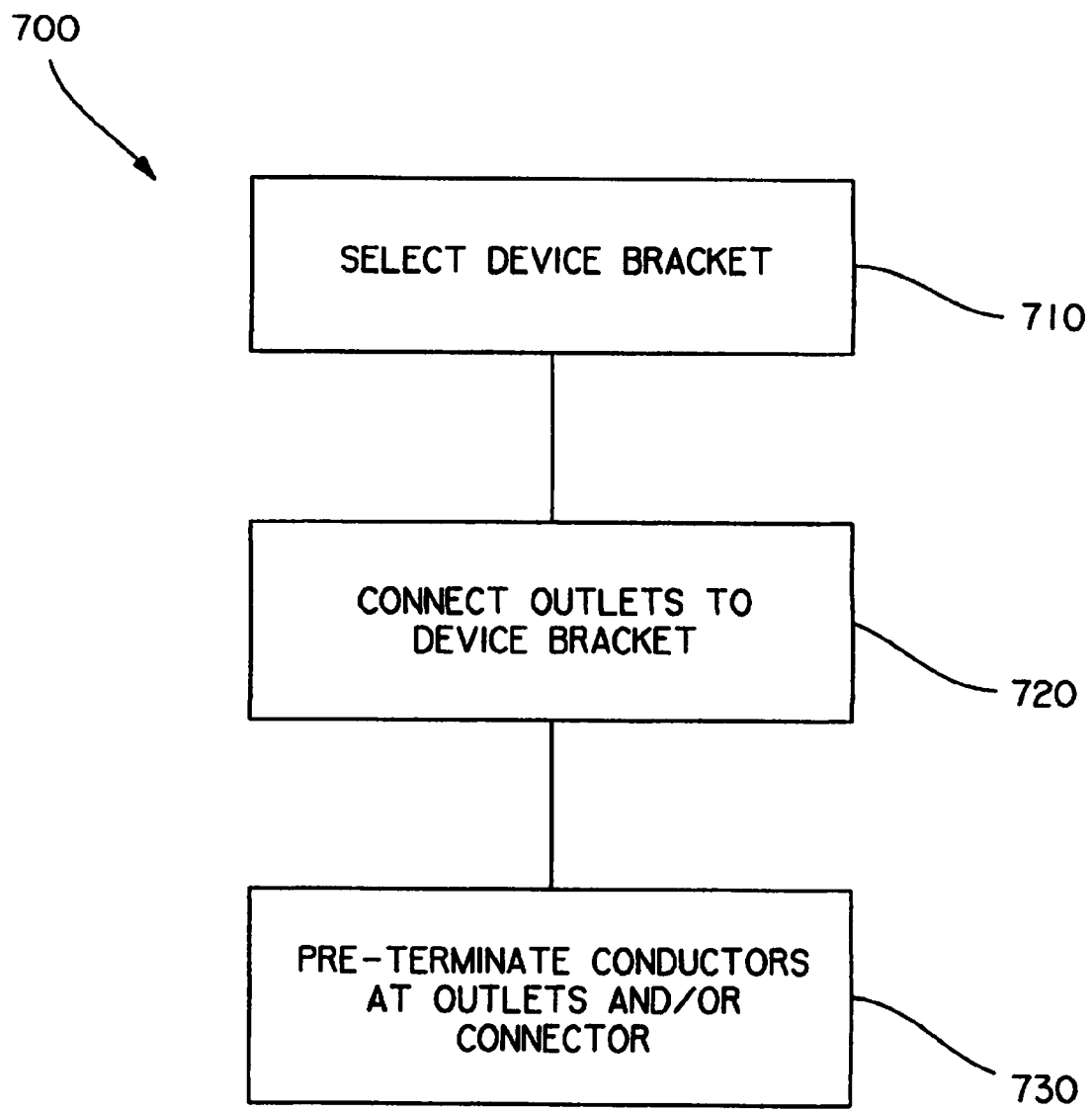
FIG. 25 is a flowchart of a method for assembling a pre-terminated outlet assembly according to one or more preferred embodiments of the present invention.

FIG. 25 is a flowchart of a method 700 for assembling a pre-terminated outlet assembly according to one or more of the preferred embodiments 100-600 of the present invention.

The method 700 includes the following steps, which are described below in more detail. At step 710, a device bracket is selected. At step 720, one or more electrical outlets are connected to the device bracket. At step 730, a plurality of electrical conductors is pre-terminated at the one or more electrical outlets and/or an electrical connector. The method 700 is described with reference to the first preferred embodiment 100 of the present invention, but it should be understood that other implementations are possible, including the other preferred embodiments 200-600 of the present invention.

At step 710, a device bracket is selected. The device bracket may be selected based at least in part on one or more criteria, such as the number of outlets (e.g., 1, 2, 4, 6, 8), the type of outlets (e.g., electrical, data), and/or the type of raceway (e.g., metal, non-metallic, single-channel, multi-channel). For example, the device bracket may be the device bracket 121 of FIGS. 1-5. The device bracket 121 includes one or more openings 125.

At step 720, one or more electrical outlets are connected to the device bracket. For example, the one or more electrical outlets may be the one or more electrical outlets 122 of FIGS. 1-5. Each of the one or more electrical outlets 122 includes a base 126 and a cover 127. The base 126 is connected to the cover 127, and the device bracket 121 is positioned therebetween. The base 126 is snap-fit into the cover 127, and the cover 127 is snap-fit into an opening 125 in the device bracket 121.

At step 730, a plurality of electrical conductors is pre-terminated at the one or more electrical outlets and/or all electrical connector. That is, the plurality of electrical conductors is electrically connected to the one or more electrical outlets and/or the electrical connector prior to installation of the pre-terminated outlet assembly. For example, the plurality of electrical conductors may be the plurality of electrical conductors 123 of FIGS. 1-5. Additionally, the electrical connector may be the electrical connector 124 of FIGS. 1-5. As best seen in FIG. 5, three electrical conductors 123 (e.g., a hot wire, a neutral wire, and a ground wire) are connected to two electrical outlets 122 in series, and to one electrical connector 124, for example, using one or more IDC's.

Figure 26:
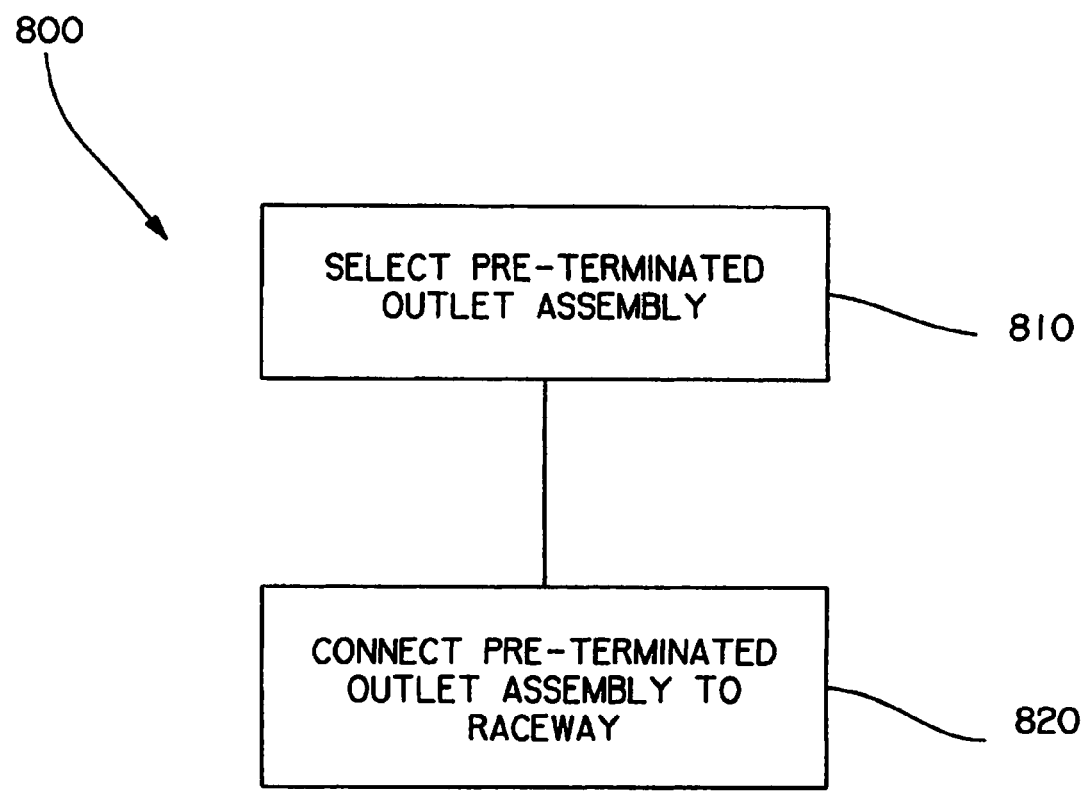
FIG. 26 is a flowchart of a method for installing a pre-terminated outlet assembly according to one or more preferred embodiments of the present invention.

FIG. 26 is a flowchart of a method 800 for installing a pre-terminated outlet assembly according to one or more preferred embodiments 100-500 of the present invention. The method 800 includes the following steps, which are described below in more detail. At step 810, a pre-terminated outlet assembly is selected. At step 820, the pre-terminated outlet assembly is connected to a raceway. The method 800 is described with reference to the first preferred embodiment 100 of the present invention, but it should be understood that other implementations are possible, including the other preferred embodiments 200-600 of the present invention.

At step 810, a pre-terminated outlet assembly is selected. The pre-terminated outlet assembly may be selected based at least in part on one or more criteria, such as the number of outlets (e.g., 1, 2, 4, 6, 8), the type of outlets (e.g., electrical, data), the type of raceway (e.g., metal, non-metallic, single-channel, multi-channel), and/or the type of connection (e.g., raceway, hanging box, outlet box). For example, the pre-terminated outlet assembly may be the pre-terminated outlet assembly 120 of FIGS. 1-5. As described above, the pre-terminated outlet assembly 120 includes a device bracket 121, one or more electrical outlets 122, a first plurality of electrical conductors 123, all electrical connector 124, and a faceplate 128. The first plurality of electrical conductors 123 is pre-terminated at the one or more electrical outlets 122 and/or the electrical connector 124.

At step 820, the pre-terminated outlet assembly is removably connected to a raceway. For example, the raceway may be the raceway 110 of FIGS. 1-5. As described above, the raceway 110 includes a base 111 and one or more covers 112. The raceway 110 also includes a divider 113. The device bracket 121 is connected to the base 112 of the raceway 110, for example, using snap-fit features. The electrical connector 124 is connected to a second plurality of electrical connectors (not shown), for example, using one or more IDC's. The second plurality of electrical conductors may be connected to a power source. After the device bracket 121 and the electrical connector 124 are installed, the covers 112 connected to the base 111 of the raceway 110, for example, using snap-fit features, and the faceplate 128 is connected to the device plate 121, for example, using one or more fasteners, such as screws.

The disclosed invention provides a pre-terminated outlet assembly for raceway systems. It should be noted that the above-described and illustrated embodiments and preferred embodiments of the invention are not an exhaustive listing of the forms such a pre-terminated outlet assembly in accordance with the invention night take; rather, they serve as exemplary and illustrative of embodiments of the invention as presently understood. By way of example, and without limitation, a pre-terminated outlet assembly having more than two electrical outlets is contemplated to be within the scope of the invention. Many other forms of the invention are believed to exist.

The invention claimed is:

1. A pre-terminated outlet assembly comprising:
   a device bracket;
   an electrical outlet connected to said device bracket, said electrical outlet comprising a base and a cover connected to said base to form a receptacle for receiving a plug;
   an insulation displacement connector; and
   a plurality of elongated electrical conductors, each of said plurality of elongated electrical conductors comprising a first end and a second end opposite said first end, said first end terminated at said electrical outlet and said second end terminated at said insulation displacement connector, wherein said plurality of elongated electrical conductors are terminated prior to installing said pre-terminated outlet assembly in a raceway.

2. The pre-terminated outlet assembly of claim 1, wherein said device bracket comprises a faceplate.

3. The pre-terminated outlet assembly of claim 1, wherein said device bracket comprises a raceway cover.

4. The pre-terminated outlet assembly of claim 1, wherein said device bracket is connectable to a raceway.

5. The pre-terminated outlet assembly of claim 1, wherein said device bracket is connectable to a divided raceway.

6. The pre-terminated outlet assembly of claim 1, wherein said device bracket is connectable to an outlet box.

7. The pre-terminated outlet assembly of claim 6, wherein said outlet box is connectable to a raceway.

8. The pre-terminated outlet assembly of claim 1, wherein said electrical outlet is adapted to provide power.

9. The pre-terminated outlet assembly of claim 1, wherein said electrical outlet is adapted to provide data.

10. The pre-terminated outlet assembly of claim 1, wherein said electrical outlet comprises a plurality of electrical outlets.

11. The pre-terminated outlet assembly of claim 1, further comprising a faceplate.

12. The pre-terminated outlet assembly of claim 1, wherein said device bracket is positioned between said base and said cover.

13. The pre-terminated outlet assembly of claim 1, wherein said plurality of elongated electrical conductors comprises a hot wire, a neutral wire, and a ground wire.

14. The pre-terminated outlet assembly of claim 11, wherein said faceplate is connected to a raceway.

15. The pre-terminated outlet assembly of claim 11, wherein said faceplate is connected to an outlet box.

16. The pre-terminated outlet assembly of claim 11, wherein said faceplate is connected to said device bracket.

* * * * *